(12) United States Patent
Okazaki

(10) Patent No.: US 10,040,947 B2
(45) Date of Patent: Aug. 7, 2018

(54) PRIMER COMPOSITION

(75) Inventor: Koju Okazaki, Ichihara (JP)

(73) Assignee: MITSUI CHEMICALS, INC., Tokyo (JP)

(*) Notice: Subject to any disclaimer, the term of this patent is extended or adjusted under 35 U.S.C. 154(b) by 171 days.

(21) Appl. No.: 12/921,775

(22) PCT Filed: Mar. 9, 2009

(86) PCT No.: PCT/JP2009/054407
§ 371 (c)(1),
(2), (4) Date: Sep. 9, 2010

(87) PCT Pub. No.: WO2009/113485
PCT Pub. Date: Sep. 17, 2009

(65) Prior Publication Data
US 2011/0014483 A1 Jan. 20, 2011

(30) Foreign Application Priority Data
Mar. 10, 2008 (JP) ................................ 2008-059825

(51) Int. Cl.
C09D 5/00 (2006.01)
B05D 7/00 (2006.01)
C08G 77/28 (2006.01)
C09D 4/06 (2006.01)
C09D 181/02 (2006.01)
C09D 183/08 (2006.01)

(52) U.S. Cl.
CPC ............. *C09D 5/002* (2013.01); *B05D 7/54* (2013.01); *C08G 77/28* (2013.01); *C09D 4/06* (2013.01); *C09D 181/02* (2013.01); *C09D 183/08* (2013.01); *Y10T 428/31663* (2015.04)

(58) Field of Classification Search
None
See application file for complete search history.

(56) References Cited

U.S. PATENT DOCUMENTS

| | | | | |
|---|---|---|---|---|
| 3,925,331 A | * | 12/1975 | Ely | ............... C08G 75/02 523/176 |
| 4,096,131 A | * | 6/1978 | Price | ............... C08G 75/14 524/609 |
| 6,037,008 A | | 3/2000 | Huang et al. | |
| 6,294,620 B1 | | 9/2001 | Huang et al. | |
| 6,319,982 B1 | | 11/2001 | Huang et al. | |
| 7,683,196 B2 | | 3/2010 | Teysseire | |
| 2008/0268253 A1 | * | 10/2008 | Murai | ............... B82Y 30/00 428/412 |

FOREIGN PATENT DOCUMENTS

| | | | | |
|---|---|---|---|---|
| EP | 0 985 718 A2 | | 3/2000 | |
| EP | 0 985 718 A3 | | 10/2000 | |
| JP | 55015974 A | * | 2/1980 | ............ C03C 27/08 |
| JP | 57-092024 | | 6/1982 | |
| JP | 02-152915 | | 6/1990 | |
| JP | 04-074190 | | 3/1992 | |
| JP | 04-164995 | | 6/1992 | |
| JP | 05-156163 | | 6/1993 | |
| JP | 07-025951 | | 1/1995 | |
| JP | 07-026207 | | 1/1995 | |
| JP | 07316431 A | * | 12/1995 | ............ C08L 81/04 |
| JP | 10-081853 | | 3/1998 | |
| JP | 11-193355 | | 7/1999 | |
| JP | 2001-055507 | | 2/2001 | |
| JP | 2001261741 A | * | 9/2001 | |
| JP | 2002-543226 | | 12/2002 | |
| JP | 2006-052168 | | 2/2006 | |
| JP | 2007-500259 | | 1/2007 | |

OTHER PUBLICATIONS

JP11193355English Machine Translation.*
JP07026207 English Machine Translation acessed JPO May 2012.*
English Machine Translation of JP 2001261741 (2001).*
English machine translation JP07316431 IPDL (1995).*
English machine translation of JP55015974 (1980).*
Supplementary European Search report for Application No. 09719556.4 dated Jun. 22, 2011.
Hayashi, et al. "Mechanisms of Various Surface-Related Phenomena on Glass" Journal of the Surface Science Society of Japan, 2001, vol. 22, pp. 55-63.
International Search Report in PCT/JP2009/054407 dated Apr. 28, 2009.
English Translation of Notification of Reasons for Refusal JP Patent Application No. 2009-550841 dated Jan. 22, 2010.

* cited by examiner

*Primary Examiner* — Kenneth J Stachel
(74) *Attorney, Agent, or Firm* — Foley & Lardner LLP

(57) ABSTRACT

The present invention aims to provide a primer composition that can give good adhesion between an acrylic resin and an inorganic substrate, such as a substrate formed of metal, metal oxide, glass, ceramic, cement, or mortar and is suitably used as a primer for bonding them together. The primer composition is produced by mixing (a) a polythiol having at least two mercapto groups in one molecule, (b) a silane compound having at least one functional group and at least one alkoxysilyl group in one molecule, the at least one functional group being reactive with a mercapto group, and water.

1 Claim, No Drawings

PRIMER COMPOSITION

TECHNICAL FIELD

The present invention relates to a primer composition that can give good adhesion between an inorganic substrate and a coating film, for example, formed of an acrylic resin.

BACKGROUND ART

In the formation of a coating film by applying a urethane paint, an epoxy paint, a polyester (alkyd) paint, an unsaturated polyester (alkyd) paint, a melamine paint, a silicone paint, a siloxane paint, an acrylic paint, or a mixed paint thereof to an inorganic substrate, such as a substrate formed of metal, metal oxide, glass, ceramic, cement, or mortar, the coating film may have poor adhesion to the inorganic substrate.

As a method for preventing this adhesion failure, a method in which a primer layer composed of a silane coupling agent is formed between an inorganic substrate and a coating film formed from the paint described above has been proposed (see, for example, Patent Document 1). Actually, this sometimes improves the adhesion between an inorganic substrate and a coating film.

However, for example, in the formation of a hard acrylic resin film by the application and polymerization of a paint containing a large amount of acrylic compound, such as a polyfunctional acrylic monomer or acrylic oligomer, that can achieve a high cross-linking density as used in hard coating, the film tends to have a relatively large polymerization shrinkage (resulting in a large internal stress and easily causing the detachment of the film) and poor flexibility (resulting in poor followability to temperature change and deformation of a substrate and easily causing the detachment of the film). Thus, a previously proposed method (for example, Patent Document 1) may achieve insufficient adhesion to an inorganic substrate.

Other propositions include a primer composition that contains a certain silane compound and an organic compound having a mercapto group to improve the adhesion to an inorganic material (Patent Documents 2 and 4), a composition suitable for paints that contains a certain silane compound and an organic mercaptan (Patent Document 3), a silicone grease composition that contains a thiol as an anticorrosive (Patent Document 5), and a silane compound having two mercapto groups suitable for semiconductor sealants (Patent Document 6).

However, these compositions and compounds disclosed in Patent Documents 2 to 6 have the following problems.

In the primer composition disclosed in Patent Document 2, the amount of usage of polythiol is smaller than the amount of usage of silane compound (for example, the mercapto group/Si group ratio=0.2 in Example 1). Thus, there is still room for improvement in adhesion between a substrate and a coating film (confirmed by the present application).

The composition disclosed in Patent Document 3 contains a silicon resin having a phenyl group and an aliphatic unsaturated group reactive with a mercapto group and an organic mercaptan having at least two mercapto groups, wherein the mercapto group/unsaturated group ratio (molar ratio) ranges from 0.7 to 2.0. However, when the composition was used as a paint, the composition had such low adhesion that a coating film on a glass plate could be mechanically detached. Thus, there is still room for improvement in adhesion (Example 2). Furthermore, use of the paint as a primer to bond an acrylic cross-linking resin to an inorganic material is not described or even suggested.

A dental adhesive composition disclosed in Patent Document 4 contains a compound that has a mercapto group having a high affinity for organic materials and metals and an alkoxysilyl or alkylsilyl group conducive to adhesion to glass. However, when the composition was used as a primer to bond an acrylic cross-linking resin to a glass plate, the composition exhibited insufficient adhesion between a substrate and a coating film even at 3-SH:3-MPS (weight ratio)=1:1 (mercapto group/(meth)acryloyl group=1.2) at which the adhesive strength was considered to be highest (confirmed by the present application).

In Patent Document 5, as it is reported that a monothiol having 24 or more carbon atoms and a dithiol having more than 16 carbon atoms have low adsorption force for metals, it has been suggested that the addition of a mercapto compound causes deterioration in adhesion.

Although Patent Document 6 proposes a silane compound having two mercapto groups to improve adhesion, raw materials for such a silane compound are difficult to obtain, and water cannot be used in manufacturing. It is therefore difficult to industrially obtain the proposed silane compound or manufacture the proposed silane compound at low cost. There is room for improvement in cost.

[Patent Document 1] Japanese Unexamined Patent Application Publication No. 10-81853
[Patent Document 2] Japanese Unexamined Patent Application Publication No. 7-26207
[Patent Document 3] Japanese Unexamined Patent Application Publication No. 5-156163
[Patent Document 4] Japanese Unexamined Patent Application Publication No. 2-152915
[Patent Document 5] Japanese Unexamined Patent Application Publication No. 4-164995
[Patent Document 6] Japanese Unexamined Patent Application Publication No. 4-74190

DISCLOSURE OF INVENTION

Problems to be Solved by the Invention

It is an object of the present invention to provide a primer that can further improve the adhesion between an inorganic substrate and a coating film.

Means for Solving the Problems

As a result of diligent investigations to achieve the object, the present inventors arrived at the present invention by finding that a primer composition produced by mixing a particular polythiol, a particular silane compound, and water can be used to more strongly bond an inorganic substrate to a coating film, in particular a coating film formed of an acrylic resin, than conventional primers.

The present invention provides the following:

[1] A primer composition produced by mixing (a) a polythiol having at least two mercapto groups in one molecule, (b) a silane compound having at least one functional group and at least one alkoxysilyl group in one molecule, the at least one functional group being reactive with a mercapto group, and water.

[2] The primer composition according to [1], wherein the polythiol of the (a) component is at least one polythiol selected from aliphatic polythiols and aromatic polythiols in which two or more mercapto groups are bonded to carbon atoms other than an aromatic ring.

[3] The primer composition according to [1], wherein the silane compound of the (b) component is a silane compound having the following general formula (1).

[Formula 1]

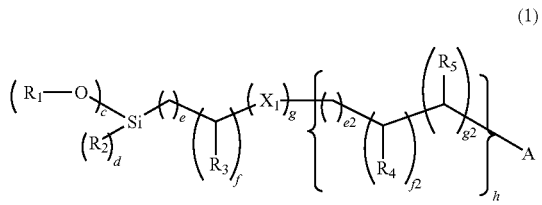

(1)

(A denotes a group having a carbon-carbon double bond, a cyclic ether group, or an isocyanato group. R1 and R2 independently denote an alkyl group having 1 to 4 carbon atoms. R3 to R5 independently denote a hydrogen atom, a methyl group, or a hydroxy group. X1 independently denotes O, S, or NH. c denotes an integer in the range of 1 to 3, d denotes an integer in the range of 0 to 2, and c+d=3. e, e2, f, and f2 independently denote an integer in the range of 0 to 10. g and g2 independently denote 0 or 1. h denotes an integer in the range of 0 to 3.)

[4] A primer composition produced by mixing (a) an aliphatic polythiol having at least two mercapto groups in one molecule, (b) a silane compound having the following general formula (1), and water.

[Formula 2]

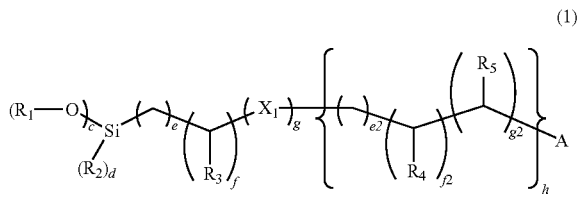

(1)

(A denotes a group having a carbon-carbon double bond, a cyclic ether group, or an isocyanato group. R1 and R2 independently denote an alkyl group having 1 to 4 carbon atoms. R3 to R5 independently denote a hydrogen atom, a methyl group, or a hydroxy group. X1 independently denotes O, S, or NH. c denotes an integer in the range of 1 to 3, d denotes an integer in the range of 0 to 2, and c+d=3. e, e2, f, and f2 independently denote an integer in the range of 0 to 10. g and g2 independently denote 0 or 1. h denotes an integer in the range of 0 to 3.)

[5] A primer layer formed by heat-curing a primer composition according to [1].

[6] A primer layer formed by heat-curing a primer composition according to [4].

[7] A layered product containing a primer layer according to [5] between an inorganic substrate and an acrylic resin layer.

[8] A layered product containing a primer layer according to [6] between an inorganic substrate and an acrylic resin layer.

[9] A method for manufacturing a layered product, involving forming a primer layer on at least one surface of an inorganic substrate, the primer layer being formed of a primer composition produced by mixing (a) a polythiol having at least two mercapto groups in one molecule, (b) a silane compound having at least one functional group and at least one alkoxysilyl group in one molecule, the at least one functional group being reactive with a mercapto group, and water, and forming an acrylic resin layer on the primer layer, the acrylic resin layer being formed from a paint containing an acrylic resin.

Advantages

A primer composition according to the present invention gives good adhesion between an inorganic substrate, such as a substrate formed of metal, metal oxide, glass, ceramic, cement, or mortar and a coating film, in particular a coating film formed of an acrylic resin.

BEST MODES FOR CARRYING OUT THE INVENTION

The present invention will be further illustrated below.
(a) Polythiol
A first essential component (hereinafter also referred to as an (a) component) of a primer composition according to the present invention is a polythiol.

The polythiol of the (a) component according to the present invention is an organic compound having no silicon atom (Si) and at least two mercapto groups. While the polythiol has two or more mercapto groups in one molecule, the polythiol usually has 2 to 10, preferably 2 to 8, more preferably 2 to 6 mercapto groups in one molecule.

Examples of the polythiol include aromatic polythiols in which two or more mercapto groups are bonded to carbon atoms of an aromatic compound (a compound having a ring satisfying the Huckel rule in which the number of n electrons is (4n+2)), and aliphatic polythiols in which two or more mercapto groups are bonded to carbon atoms of an organic compound other than the aromatic compound.

Examples of the aromatic polythiol include aromatic polythiols (1) in which two or more mercapto groups are directly bonded to carbon atoms forming an aromatic ring (a ring satisfying the Huckel rule in which the number of π electrons is (4n+2)) in an aromatic compound, and aromatic polythiols (2) in which two or more mercapto groups are bonded to carbon atoms other than carbon atoms of an aromatic ring in the aromatic compound.

Examples of the aliphatic polythiol include aliphatic polythiols (1) in which two or more mercapto groups are bonded to carbon atoms of a chain compound, and aliphatic polythiols (2) in which two or more mercapto groups are bonded to carbon atoms of a non-aromatic ring compound.

Hydrocarbon chains (alkane, alkene, alkyne, and the like) in the polythiols described above may be a straight chain or a branched chain.

The polythiols described above may have bonds formed of atomic groups containing atoms other than carbon, for example, an ether bond, an ester bond, a carbonate bond, a sulfide bond, a disulfide bond, an amino bond, an amide bond, and a sulfonyl bond.

Examples of the aromatic polythiols (1) include benzene-1,2-dithiol, benzene-1,3-dithiol, benzene-1,4-dithiol, benzene-1,3,5-trithiol, toluene-2,4-dithiol, toluene-2,6-dithiol, naphthalene-1,5-dithiol, naphthalene-1,8-dithiol, bis(4-mercaptophenyl)methane, bis(4-mercaptophenyl)-2,2-propane, bis(4-mercaptophenyl) sulfide, tris(4-mercaptophenyl)methane, and thiophenedithiol.

Examples of the aromatic polythiols (2) include m-xylylenedithiol, p-xylylenedithiol, 1,4-bis(mercaptoethyl)benzene, isophthalic acid bis(2-mercaptoethyl ester), terephthalic acid bis(2-mercaptoethyl ester), benzene-1,3-dithioglycolate, benzene-1,4-dithioglycolate, benzene-1,3,5-trithioglycolate, benzene-1,3-bis(3-mercaptopropionate), benzene-1,4-bis(3-mercaptopropionate), benzene-1,3,5-tris(3-mercaptopropionate), m-xylylenediol dithioglycolate, p-xylylenediol dithioglycolate, m-xylylenediol bis(3-mercaptopropionate), and p-xylylenediol bis(3-mercaptopropionate).

Examples of the aliphatic polythiols (1) include compounds in which two or more mercapto groups are bonded to hydrocarbons, such as ethane-1,2-dithiol, propane-1,3-dithiol, butane-1,4-dithiol, hexane-1,6-dithiol, octane-1,8-dithiol, decane-1,10-dithiol, bis(mercaptoethyl)ether, bis(mercaptoethyl) sulfide, 3,6-dioxaoctane-1,8-dithiol, 3,6-dithiaoctane-1,8-dithiol, propane-1,2,3-trithiol, 4-mercaptomethyl-3,6-dithiaoctane-1,8-dithiol, 4,8-bis(mercaptomethyl)-3,6,9-trithiaundecane-1,11-dithiol; polyα-mercaptopropionate and polyβ-mercaptopropionate, such as ethylene glycol bis(3-mercaptopropionate), diethylene glycol bis(3-mercaptopropionate), 1,2-propanediol bis(3-mercaptopropionate), 1,3-propanediol bis(3-mercaptopropionate), 1,4-butanediol bis(3-mercaptopropionate), 1,6-hexanediol bis(3-mercaptopropionate), neopentyl glycol bis(3-mercaptopropionate), poly(ethylene glycol)bis(3-mercaptopropionate), poly(propylene glycol)bis(3-mercaptopropionate), glycerin-1,3-bis(3-mercaptopropionate), trimethylolpropane tris(3-mercaptopropionate), trimethylolpropane tris(2-mercaptopropionate), pentaerythritol tris(3-mercaptopropionate), pentaerythritol tetrakis(3-mercaptopropionate), pentaerythritol tetrakis(2-mercaptopropionate), dipentaerythritol pentakis(3-mercaptopropionate), and dipentaerythritol hexakis(3-mercaptopropionate); and polymercaptoglycolates, such as ethylene glycol dithioglycolate, diethylene glycol dithioglycolate, 1,2-propanediol dithioglycolate, 1,3-propanediol dithioglycolate, 1,4-butanediol dithioglycolate, 1,6-hexanediol dithioglycolate, neopentyl glycol dithioglycolate, poly(ethylene glycol) dithioglycolate, poly(propylene glycol) dithioglycolate, glycerin-1,3-dithioglycolate, trimethylolpropane trithioglycolate, pentaerythritol trithioglycolate, pentaerythritol tetrathioglycolate, dipentaerythritol pentathioglycolate, and dipentaerythritol hexathioglycolate.

Examples of the aliphatic polythiols (2) include cyclopentane-2,5-dithiol, cyclopentane-2,5-bis(mercaptomethyl), cyclohexane-1,3-dithiol, cyclohexane-1,4-dithiol, cyclohexane-1,3-bis(mercaptomethyl), cyclohexane-1,4-bis(mercaptomethyl), bis(4-mercaptocyclohexyl)methane, bis(4-mercaptocyclohexyl)-2,2-propane, bis(4-mercaptocyclohexyl) sulfide, tetrahydrothiophenedithiol, tetrahydrothiophene-2,5-bis(mercaptomethyl), 1,4-dithiane-2,5-bis(mercaptomethyl), cyclohexane-1,3-bis(thioglycolate), cyclohexane-1,3-bis(3-mercaptopropionate), cyclohexane-1,4-bis(thioglycolate), cyclohexane-1,4-bis(3-mercaptopropionate), hexahydro-m-xylylenediol dithioglycolate, hexahydro-m-xylylenediol bis(3-mercaptopropionate), hexahydro-p-xylylenediol dithioglycolate, hexahydro-p-xylylenediol bis(3-mercaptopropionate), tricyclodecanedimethanol dithioglycolate, tricyclodecanedimethanol-bis(3-mercaptopropionate), N,N'-bis(mercaptoethyl)-ethylene urea, N,N'-bis(2-mercaptomethyl-5-mercapto-3-thiapentyl)-ethylene urea, N,N',N''-tris(2-mercaptoethyl)isocyanurate, N,N',N''-tris(5-mercapto-3-oxapentyl-4-on)isocyanurate, and N,N',N''-tris(6-mercapto-3-oxaheptyl-4 on)isocyanurate.

Among the polythiols described above, the aromatic polythiols (2), the aliphatic polythiols (1), and the aliphatic polythiols (2) are preferred because they are rarely crystallized and are easy to use and are highly reactive with a silane compound, which is a (b) component described below, and paint forming a coating film.

The aliphatic polythiols (1) are also preferred because the aliphatic polythiols (1) tend to have low viscosity.

Among the aliphatic polythiols (1), polyβ-mercaptopropionate having a structure represented by the following formula (I), polymercaptoglycolate (polythioglycolate), and polyα-mercaptopropionate having a structure represented by the following formula (II), in which a mercapto group is bonded to an ester bond via an alkylene having 1 to 2 carbon atoms, are preferred in terms of a low malodor. Among these compounds, polyα-mercaptopropionate and polyβ-mercaptopropionate are more preferred in terms of a lower malodor.

[Formula 3]

(In the formula (I), n is 1 or 2.)

[Formula 4]

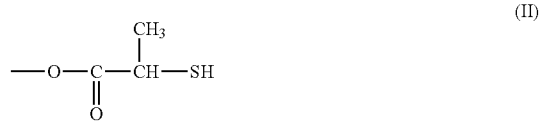

Polythiols of the (a) component may be used alone or in combination.

(b) Silane Compound

A second essential component (hereinafter also referred to as a (b) component) of a primer composition according to the present invention is a silane compound having at least one functional group and at least one alkoxysilyl group in one molecule, the at least one functional group being reactive with a mercapto group.

Examples of the functional group reactive with a mercapto group include halide groups, carboxylic acid halide groups, carboxylic acid anhydride groups, groups having a carbon-carbon double bond, cyclic ether groups, cyclic thioether groups, isocyanato groups, and isothiocyanato groups. Among the functional groups reactive with a mercapto group, groups having a carbon-carbon double bond, cyclic ether groups, and isocyanato groups are preferred in terms of high reactivity and ease of use.

The alkoxysilyl group has a general formula $(RO)_nSi-$ (wherein n denotes an integer in the range of 1 to 3, and R denotes an alkyl group) and is generally a functional group in which 1 to 3 (n) alkoxy groups having 1 to 4 carbon atoms are bonded to a silicon atom.

Examples of the alkoxysilyl group include a trimethoxysilyl group, a dimethoxysilyl group, a monomethoxysilyl group, a triethoxysilyl group, a diethoxysilyl group, a monoethoxysilyl group, a tripropoxysilyl group, a dipropoxysilyl group, a monopropoxysilyl group, a tributoxysilyl group, a dibutoxysilyl group, and a monobutoxysilyl group.

The central structure separated from the alkoxysilyl group and the functional group reactive with a mercapto group of the silane compound of the (b) component has a straight or branched chain structure and may contain an aromatic ring or an aliphatic ring structure (non-aromatic ring).

Among these silane compounds, silane compounds having the following general formula (1) are preferred.

[Formula 5]

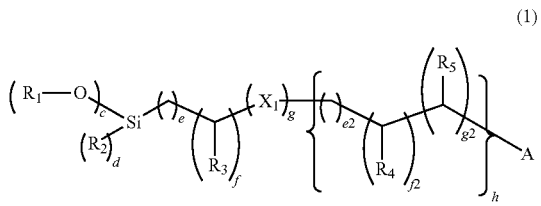

(1)

In the formula (1), R1 and R2 independently denote an alkyl group having 1 to 4 carbon atoms. Among these groups, alkyl groups having 1 to 2 carbon atoms are relatively preferred.

R3 to R5 independently denote a hydrogen atom, a methyl group, or a hydroxy group.

X1 independently denotes O, S, or NH. Among these, O or S is relatively preferred, and O tends to be more preferred.

c denotes an integer in the range of 1 to 3, d denotes an integer in the range of 0 to 2, and c+d=3. e, e2, f, and f2 independently denote an integer in the range of 0 to 10. Among these, an integer in the range of 0 to 5 is relatively preferred, and an integer in the range of 0 to 3 tends to be more preferred. g and g2 independently denote 0 or 1. h denotes an integer in the range of 0 to 3. Among these, an integer in the range of 0 to 2 is relatively preferred, and 0 or 1 tends to be more preferred.

A denotes a functional group having a carbon-carbon double bond, a cyclic ether group, or an isocyanato group, which are highly reactive with a mercapto group.

Examples of the functional group having a carbon-carbon double bond include groups having a vinyl carbon-carbon double bond, groups having an isopropenyl carbon-carbon double bond, groups having an allyl carbon-carbon double bond, and groups having a (meth)acryloyl carbon-carbon double bond.

Examples of the groups having a vinyl carbon-carbon double bond include a vinyl group, a vinyl ether group, a vinyl thioether group, a vinyl amino group, a vinyl phenyl group (a styryl group), and a vinyl carbonate group.

Examples of the groups having an isopropenyl carbon-carbon double bond include an isopropenyl group, an isopropenyl ether group, an isopropenyl thioether group, an isopropenylamino group, an isopropenylphenyl group, and an isopropenyl carbonate group.

Examples of the groups having an allyl carbon-carbon double bond include an allyl group, an ally ether group, an allyl thioether group, an allylamino group, an allylphenyl group, an allyl carbonate group, an allylthio-carbonyl-oxy group, an allyloxy-carbonyl-thio group, and an allylthio-carbonyl-thio group.

The groups having a (meth)acryloyl carbon-carbon double bond are groups in which a carbonyl group is adjacent to and bonded to a carbon-carbon double bond. Examples of such groups include an acryloyl group, an acryloyloxy group, an acryloylthio group, an acrylamide group, a methacryloyl group, a methacryloyloxy group, a methacryloylthio group, and a methacrylamide group.

Among these functional groups having a carbon-carbon double bond, functional groups containing a group having a (meth)acryloyl carbon-carbon double bond tend to be relatively preferred because they are highly reactive in an addition reaction (Michael addition) with a mercapto group of the polythiol of the (a) component. Among these functional groups containing a group having a (meth)acryloyl carbon-carbon double bond, an acryloyloxy group and an acryloylthio group tend to be more preferred.

The cyclic ether group is a group having a cyclic ether structure composed of a plurality of carbon atoms and one oxygen atom. Examples of the cyclic ether group include an epoxy group, a glycidyl group, a glycidyloxy group, a glycidylthio group, a glycidylamino group, a cyclohexeneoxide group, and an oxetane group.

An epoxy group, a glycidyl group, a glycidyloxy group, a glycidylthio group, a glycidylamino group, and a cyclohexeneoxide group have a three-membered ring composed of two carbon atoms and one oxygen atom and have the following general formula (2) (in the formula (2), * denotes a bond).

[Formula 6]

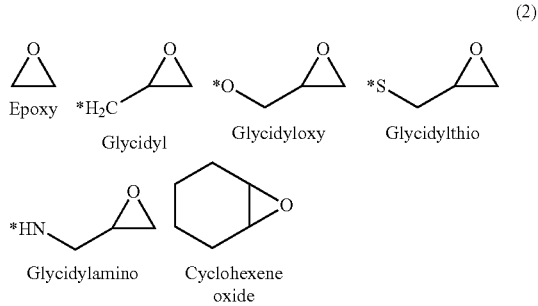

(2)

An oxetane group has a four-membered ring composed of three carbon atoms and one oxygen atom and has the following general formula (3).

[Formula 7]

(3)

Cyclic ether groups having a three-membered ring and a four-membered ring can easily react with a mercapto group of a polythiol of the (a) component in the presence of a base as shown in the following general formulae (4) and (5) and are therefore preferred.

[Formula 8]

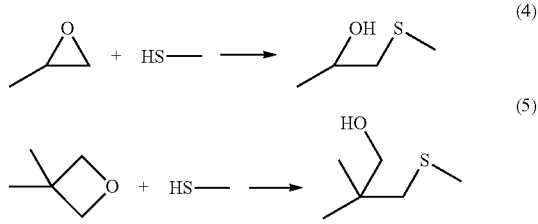

(4)

(5)

The isocyanato group has the following general formula (6).

[Formula 9]

—NCO (6)

Likewise, as shown in the following general formula (7), an isocyanato group can easily undergo a urethane reaction with a mercapto group of the polythiol of the (a) component and is therefore preferred. In this case, a urethane-forming catalyst, typically a basic compound, such as a tertiary amine, and a tin compound, such as dibutyltin dilaurate, may be added to further improve the reactivity with a mercapto group.

[Formula 10]

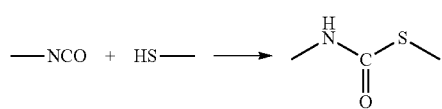

(7)

Among the compounds having the general formula (1), examples of preferred compounds include compounds listed in the following table.

[Formula 11]

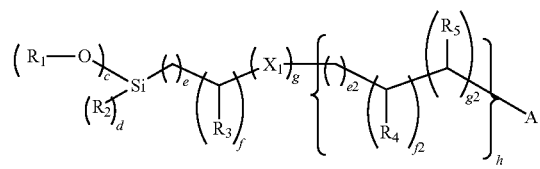

(1)

TABLE 1

|   | Compound 1 | Compound 2 | Compound 3 | Compound 4 | Compound 5 | Compound 6 | Compound 7 | Compound 8 | Compound 9 | Compound 10 |
|---|---|---|---|---|---|---|---|---|---|---|
| c | 3 | 3 | 2 | 3 | 2 | 3 | 3 | 3 | 3 | 3 |
| d | 0 | 0 | 1 | 0 | 1 | 0 | 0 | 0 | 0 | 0 |
| e | 2 | 2 | 3 | 1 | 0 | 2 | 2 | 0 | 0 | 0 |
| f | 1 | 1 | 0 | 2 | 3 | 1 | 1 | 0 | 0 | 0 |
| g | 1 | 1 | 1 | 1 | 1 | 1 | 1 | 0 | 0 | 0 |
| e2 | 0 | 0 | 0 | 0 | 0 | 0 | 0 | 0 | 0 | 0 |
| f2 | 0 | 0 | 0 | 0 | 0 | 0 | 0 | 0 | 0 | 0 |
| g2 | 0 | 0 | 0 | 0 | 0 | 0 | 0 | 0 | 0 | 0 |
| h | 0 | 0 | 0 | 0 | 0 | 0 | 0 | 0 | 0 | 0 |
| R1 | CH3 | C2H5 | CH3 | CH3 | CH3 | CH3 | CH3 | CH3 | CH3 | CH3 |
| R2 | — | — | CH3 | — | CH3 | — | — | — | — | — |
| R3 | H | H | — | H | H | H | H | — | — | H |
| X1 | O | O | O | O | O | S | NH | — | — | — |
| R4 | — | — | — | — | — | — | — | — | — | — |
| R5 | — | — | — | — | — | — | — | — | — | — |
| A | Acryloyl | Acryloyl | Acryloyl | Methacryloyl | Methacryloyl | Acryloyl | Acryloyl | Vinyl | Styryl | Cyclohexeneoxide |

TABLE 2

|   | Compound 11 | Compound 12 | Compound 13 | Compound 14 | Compound 15 | Compound 16 | Compound 17 | Compound 18 | Compound 19 | Compound 20 |
|---|---|---|---|---|---|---|---|---|---|---|
| c | 3 | 2 | 3 | 3 | 3 | 3 | 3 | 3 | 3 | 3 |
| d | 0 | 1 | 0 | 0 | 0 | 0 | 0 | 0 | 0 | 0 |
| e | 3 | 0 | 2 | 3 | 0 | 3 | 1 | 6 | 0 | 3 |
| f | 0 | 3 | 1 | 0 | 0 | 0 | 1 | 0 | 0 | 0 |
| g | 1 | 1 | 1 | 1 | 0 | 1 | 1 | 1 | 0 | 1 |
| e2 | 1 | 0 | 0 | 2 | 1 | 1 | 1 | 0 | 1 | 1 |
| f2 | 0 | 1 | 0 | 0 | 1 | 1 | 0 | 0 | 1 | 0 |
| g2 | 0 | 0 | 1 | 0 | 1 | 1 | 1 | 0 | 1 | 1 |
| h | 1 | 1 | 1 | 1 | 1 | 1 | 1 | 0 | 1 | 1 |
| R1 | CH3 | CH3 | Et | CH3 | Et | CH3 | CH3 | CH3 | CH3 | CH3 |
| R2 | — | CH3 | — | — | — | — | — | — | — | — |
| R3 | — | H | H | — | — | — | CH3 | — | — | — |
| X1 | O | O | O | NH | — | O | O | O | — | NH |
| R4 | — | H | — | — | H | OH | — | — | H | — |
| R5 | — | — | H | — | H | H | CH3 | — | H | H |
| A | Epoxy | Epoxy | Epoxy | Styrylmethylamino | Isocyanato | Glycidyloxy | Acryloyloxy | Methacryloyl | Glycidylthio | Acrylamide |

The silane compounds of the (b) component may be used alone or in combination.

A primer composition according to the present invention is generally produced by mixing a polythiol of the (a) component and a silane compound of the (b) component to at least partly react a mercapto group of the (a) component with a functional group of the (b) component reactive with a mercapto group and converting at least part of an alkoxysilyl group derived from the (b) component into a hydroxysilyl group by hydrolysis with water.

A primer composition according to the present invention may also be produced by hydrolyzing at least part of an alkoxysilyl group of a silane compound of the (b) component with water and mixing the resulting product with a polythiol of the (a) component to allow at least part of a mercapto group of the (a) component and a functional group of the (b) component reactive with a mercapto group to react.

In the (a) component and the (b) component described above, the molar ratio of a mercapto group of the (a) component to a functional group of the (b) component reactive with a mercapto group [the number of moles of a mercapto group of the (a) component/the number of moles of a functional group of the (b) component reactive with a mercapto group] generally ranges from 10/1 to 10/8, preferably 10/2 to 10/7, more preferably 10/3 to 10/6.

The molar ratio below the lower limit or above the upper limit tends to result in poor adhesion.

The mixing (reaction) molar ratio of a polythiol of the first essential component [(a) component] to a silane compound of the second essential component [(b) component] [(a) component/(b) component] generally ranges from 10/5 to 10/100, preferably 10/10 to 10/50, more preferably 10/20 to 10/40.

The typical reaction described above is illustrated by the following formula (8) including a representative compound.

[Fomula 12]

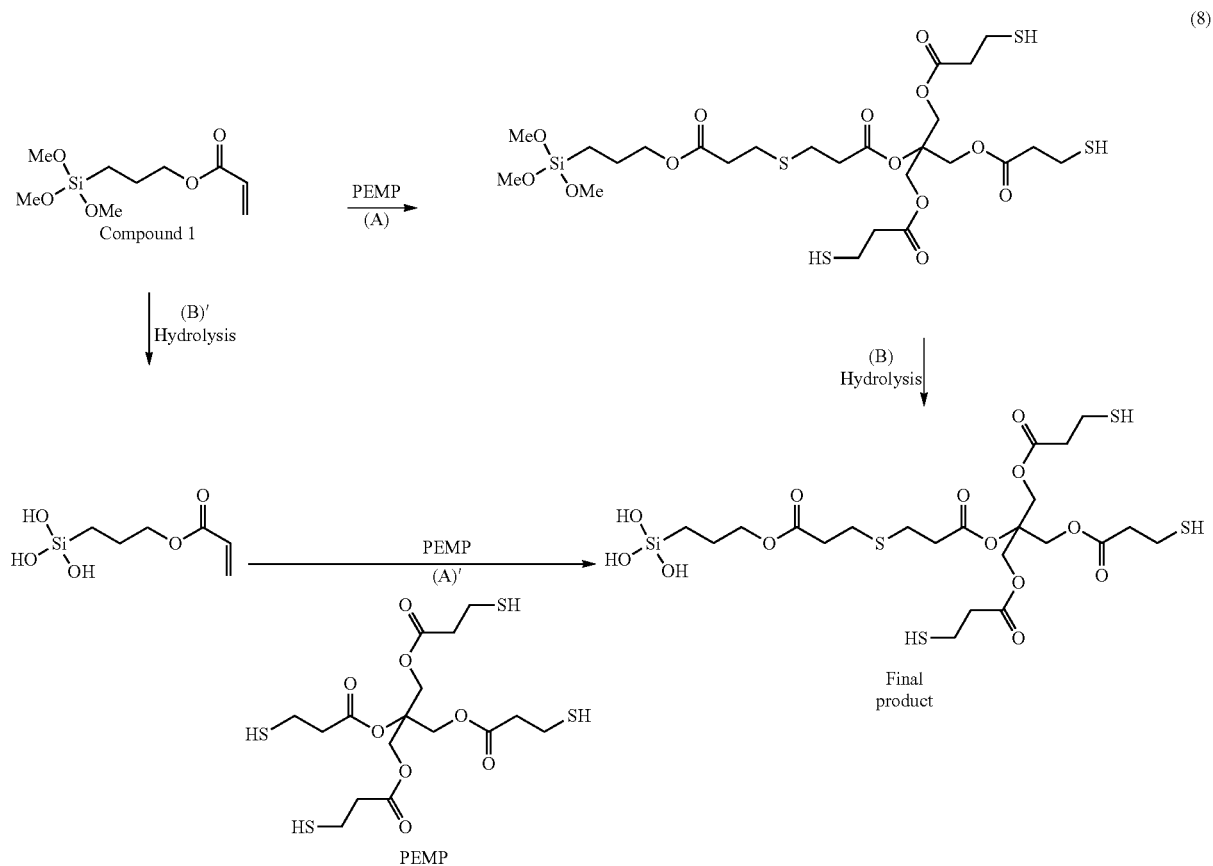

As illustrated by the formula (8), typical preparation routes for a primer composition according to the present invention involve the addition reaction between a functional group (for example, an acryloyl group) of a silane compound (for example, a compound I) reactive with a mercapto group and at least part of a mercapto group of a polythiol (for example, PMEP: pentaerythritol tetrakis(3-mercaptopropionate)) and the hydrolysis of at least part of an alkoxyl group (a preparation route (A)→(B)), and the hydrolysis of at least part of an alkoxyl group of a silane compound (for example, a compound I) and the addition reaction between at least part of a functional group (for example, an acryloyl group) of the resulting product reactive with a mercapto group and a mercapto group of a polythiol(for example, PMEP) (preparation route (B)'→(A)').

Although the preparation route is appropriately selected for each purpose, earlier hydrolysis of an alkoxyl group may cause a dehydration condensation reaction of the resulting hydroxysilyl group itself and tends to decrease the working life (pot life) before gelation. It therefore tends to be generally preferable that the addition reaction is followed by the hydrolysis (preparation route (A)→(B)).

Although the reactions in (A) and (A)' (an addition reaction of a mercapto group) proceed at room temperature, the reaction temperature may be increased or a catalyst may be added to reduce the reaction time. The reaction temperature ranges from approximately 20° C. to 200° C., preferably 20° C. to 100° C. The catalyst may be a basic substance, for example, a phosphine, such as tributylphosphine or triphenylphosphine, or an amine, such as triethylamine or N-methylpyrrolidone.

In the case that a functional group of a silane compound of the (b) component reactive with a mercapto group is a cyclic ether group, such as an epoxy group, the reaction temperature and the catalyst are the same as described above for the group having a carbon carbon double bond (an acryloyl group).

However, in the case that the functional group reactive with a mercapto group is an isocyanato group, the reaction temperature is the same, but the catalyst is somewhat different. In the case that the functional group reactive with a mercapto group is an isocyanato group, the catalyst may be a tin compound, such as dibutyltin dilaurate, dioctyltin dilaurate, dioctyltin dichloride, or dimethyltin dichloride, as well as a basic substance, such as a phosphine or an amine. These basic substances and tin compounds may be used in combination.

The reactions in (B) and (B)' (hydrolysis of an alkoxysilyl group) are generally performed by the addition of water and agitation at room temperature.

The amount of water to be added ranges from 0.1 to 100 equivalents, preferably 0.5 to 10 equivalents, more preferably 1 to 5 equivalents, per equivalent of alkoxy group derived from an alkoxysilyl group of the silane compound (b).

Preferably, a catalyst is added to promote the hydrolysis.

Examples of the catalyst for use in the hydrolysis include acids, such as hydrochloric acid, sulfuric acid, phosphoric acid, citric acid, and acetic acid, bases, such as NaOH, KOH, and ammonia, and inorganic salts, such as KF and NaF. Among these catalysts, volatile catalysts, such as hydrochloric acid, acetic acid, and ammonia, tend to be preferably used to reduce the amount of catalyst remaining. A catalyst for use in the hydrolysis also serves as a catalyst for a condensation reaction between the resulting hydroxysilyl group and a reactive group on the surface of an inorganic substrate, for example, a silanol group, and a condensation reaction of the resulting hydroxysilyl group itself.

The amount of catalyst to be added ranges from approximately 0.1% to 100% by weight, preferably 0.3% to 50% by weight, more preferably 0.5% to 20% by weight, of the total weight of a polythiol of the (a) component and a silane compound of the (b) component.

Although the hydrolysis of an alkoxysilyl group generally proceeds at room temperature, the temperature may be increased to improve the hydrolysis rate. However, an increase in the temperature to an excessively high temperature, for example, approximately 100° C., results in a heat-curing reaction between hydroxysilyl groups resulting from the hydrolysis, likely causing failures, such as gelation of a primer composition in a short period of time.

Thus, with respect to pot life, the hydrolysis temperature ranges from approximately 0° C. to 50° C., preferably 10° C. to 40° C., more preferably 20° C. to 30° C. In addition to a polythiol of the (a) component, a silane compound of the (b) component, and water, a primer composition according to the present invention may contain a solvent. Examples of the solvent include alcohols, such as methanol, ethanol, isopropanol (IPA), n-butanol, and methoxyethanol, aprotic polar solvents, such as acetonitrile, DMF, and DMSO, ester solvents, such as ethyl acetate, butyl acetate, and isoamyl acetate, ketone solvents, such as acetone, methyl ethyl ketone, and methyl isobutyl ketone, and mixed solvents thereof.

In the case that the functional group of a silane compound of the (b) component reactive with a mercapto group is an isocyanato group, it is preferable that an alcohol, water, or a mixed solvent thereof reactive with the isocyanato group is not used before the completion of a reaction between a mercapto group of a polythiol of the (a) component and the isocyanato group.

Another silane compound other than the (b) component may be added to a primer composition according to the present invention to adjust the hardness of the primer, promote the hydrolysis of an alkoxysilyl group, or improve the adhesion to a substrate, such as a metal or inorganic substrate. Examples of the silane compound include tetramethoxysilane, tetraethoxysilane, methyltrimethoxysilane, propyltrimethoxysilane, trifluoropropyltrimethoxysilane, hexyltrimethoxysilane, decyltrimethoxysilane, dimethyldimethoxysilane, biphenyltrimethoxysilane, diphenyldimethoxysilane, 3-aminopropyltrimethoxysilane, 3-trimethoxysilyl-N-(1,3-dimethyl-butylidene)propylamine, N-(2-aminoethyl)-N-(3-trimethoxysilyl-propyl)amine, N-(2-aminoethyl)-N-[3-{(dimethoxy)(methyl)}silyl-propyl)amine, 3-(phenylamino)propyl-trimethoxysilane, 3-ureidopropyltrimethoxysilane, 2-piperidinoethyltrimethoxysilane, 3-piperazinopropyl-trimethoxysilane, 3-morpholinopropyl-trimethoxysilane, 3-chloropropyltrimethoxysilane, hydroxymethyl-trimethoxysilane, mercaptomethyl-trimethoxysilane, 3-mercaptopropyltrimethoxysilane, 3-mercaptopropyl-methyldimethoxysilane, and bis (triethoxysilylpropy) tetrasulfide.

If necessary, various filling materials may be used in a primer composition according to the present invention. Examples of the filling materials include, wood flour, pulp, cotton chips, asbestos, glass fiber, carbon fiber, mica, walnut shell flour, rice hull flour, graphite, diatomaceous earth, white clay, fumed silica, precipitated silica, anhydrous silicic acid, carbon black, calcium carbonate, magnesium carbonate, clay, talc, titanium oxide, cerium oxide, magnesium carbonate, quartz powder, aluminum fine powder, iron oxide, flint powder, and zinc dust. These filling materials may be used alone or in combination.

A primer composition according to the present invention may contain various additive agents other than the filling materials, if necessary. Examples of the additive agents include an ultraviolet absorber, a hindered amine light stabilizer (HALS), a radical scavenger, an antioxidant, a polymerization inhibitor, an age resister, an antiozonant, a metal deactivator, a storage stability improver, pigment, dye, a binder, and a leveling agent.

A primer composition according to the present invention can be particularly suitably used as a primer for a coating film formed from a compound having in one molecule one or more groups having a (meth)acryloyl carbon-carbon double bond, from a composition containing the compound, or from an acrylic resin produced by the polymerization of the compound.

Coating Method and Usage

A primer composition according to the present invention can be applied to a surface of inorganic substrates, for example, various metals, such as iron, stainless steel, aluminum, nickel, zinc, gold, silver, and copper, articles in which surfaces of various substrates are plated with these metals, oxides of these metals, glass, ceramic, cement, slate, stone, such as marble and granite, and mortar, and can be heat-cured. The term "inorganic substrate", as used herein, refers to a substrate in which a surface in contact with a primer composition according to the present invention is formed of an inorganic substrate, typically the substances described above.

Such procedures cause interaction between a hydroxysilyl group in a primer composition and a functional group having a high affinity for a hydroxy group on a surface of an inorganic substrate, typically, a condensation reaction between a hydroxysilyl group in a primer and a reactive group, such as a hydroxy group, on a surface of an inorganic substrate, and a condensation reaction between hydroxysilyl groups of the primer composition, thereby forming a primer layer firmly bonded to the surface of the inorganic substrate.

A urethane paint, an epoxy paint, a polyester (alkyd) paint, an unsaturated polyester (alkyd) paint, a melamine paint, a silicone paint, a siloxane paint, an acrylic paint, or a mixed paint thereof can be applied to the primer layer thus formed and can be dried or polymerized by heat or radiation to form a coating film.

A primer composition according to the present invention is generally produced by mixing a polythiol of the (a) component and a silane compound of the (b) component at a molar ratio of a mercapto group of the (a) component to a functional group of the (b) component reactive with a mercapto group [the number of moles of a mercapto group of the (a) component/the number of moles of a functional group of the (b) component reactive with a mercapto group] in the range of 10/1 to 10/8 to convert an alkoxysilyl group derived from the (b) component into a hydroxysilyl group by hydrolysis. The primer composition thus produced is applied to a surface of an inorganic substrate and is heat-cured to form a primer layer.

A primer layer according to the present invention therefore has a large amount of mercapto group on the surface. Thus, a paint layered thereon preferably contains a compound to which a functional group having high reactivity or strong interaction with the mercapto group is bonded.

Examples of paints preferably used among the paints described above include a urethane paint containing a compound having an isocyanato group, an epoxy paint containing a compound having a cyclic ether group (for example, an epoxy group, a glycidyl group, a cyclohexeneoxide group, or an oxetane group), and an unsaturated polyester (alkyl) paint and an acrylic paint containing a compound to which a functional group having a carbon-carbon double bond (for example, a group having a vinyl carbon-carbon double bond, a group having an isopropenyl carbon-carbon double bond, a group having an allyl carbon-carbon double bond, or a group having a (meth)acryloyl carbon-carbon double bond) is bonded.

Among these paints, examples of paints more preferably used include an unsaturated polyester (alkyd) paint and an acrylic paint having weak interaction with an inorganic substrate, such as a glass plate, and a large primer effect. Examples of still more preferred paints include an acrylic paint having higher reactivity with a mercapto group.

A paint, for example, an acrylic paint containing a compound to which one or more groups having a (meth)acryloyl carbon-carbon double bond in one molecule are bonded is applied to a primer layer according to the present invention formed on a surface of an inorganic substrate and is polymerized to form a coating film (acrylic resin layer), thus producing a layered product containing the primer layer between the inorganic substrate and the resin layer formed from the paint, for example, the acrylic resin layer.

Through a series of these procedures, an inorganic substrate and a resin layer formed from a paint, for example, a coating film containing an acrylic resin are firmly bonded together via a primer layer formed of a primer composition according to the present invention. Although the reason for such firm bonding is not clear in detail, it is assumed that the primer layer contains a group having a high affinity for a resin layer formed from a paint, particularly an acrylic resin layer, and a reaction occurs between a residual mercapto group on the surface of the primer layer and a reactive group in the paint, particularly a group having a (meth)acryloyl carbon-carbon double bond in the acrylic paint. Thus, the primer layer and the coating film containing the resin, particularly the coating film containing the acrylic resin, are firmly bonded together.

Among the inorganic substrates described above, inorganic substrates having surfaces formed of glass, metal, plated metal, metal oxide, and ceramic are preferred, inorganic substrates having surfaces formed of glass, metal, metal oxide, and ceramic are more preferred, and inorganic substrates having surfaces formed of glass are still more preferred.

Before a primer layer is formed, the inorganic substrate may be surface-treated to improve adhesion. Examples of the surface treatment include physical treatment, such as corona treatment, flame treatment, plasma treatment, ozone treatment, low-temperature plasma treatment using oxygen or nitrogen gas, and glow discharge treatment, and chemical treatment, such as oxidation by an oxidizing agent and etching by an acid or alkaline.

Before a primer layer is formed on a surface of an inorganic substrate, the surface is preferably washed well in advance to remove deposits on the surface to improve the adhesion between the surface of the inorganic substrate and the primer layer. A convenient method for measuring the contamination level of a surface of an inorganic substrate may be the measurement of the water contact angle.

Examples of contaminants deposited on a surface of an inorganic substrate include sebum, fats and oils, silicone, a plasticizer bleeding out from a package, and outdoor hydrophobic substances dispersed from exhaust gas and suspended in the atmosphere. In many instances, these substances exhibit hydrophobicity.

Thus, a contaminated surface of an inorganic substrate often has hydrophilicity lower than the intrinsic hydrophilicity of the substrate. When a primer composition according to the present invention is applied to such a contaminated surface of an inorganic substrate, crawling is likely to occur, and a uniform primer layer cannot be formed. This tends to result in poor adhesion at an interface between the surface of the inorganic substrate and the primer layer or at an interface between the primer layer and a coating film containing a resin, such as an acrylic resin. Since the primer layer is formed on contaminants deposited on the surface of the inorganic substrate, the contaminants cause a decrease in the adhesion at the interface between the surface of the inorganic substrate and the primer layer.

Among these inorganic substrates, a glass plate is particularly apt to be contaminated on the surface and is easily contaminated with silicone from packing materials and scratch-resistant sheets and hydrophobic substances suspended in the air. For example, while it is believed that glass has an intrinsic hydrophilicity with an water contact angle of 5° (Hyomen Kagaku (Journal of The Surface Science Society of Japan) vol. 22, pp. 55-63, 2001), a surface of a glass plate purchased has a water contact angle in the range of 50° to 70° and is significantly contaminated.

Thus, even when a primer composition according to the present invention is used, it is difficult to achieve sufficient adhesion to a glass plate that is purchased and directly used. Furthermore, even after ultrasonic cleaning of a glass plate in water is performed (water contact angle 25° to 35°), it tends to be difficult to achieve sufficient adhesion. In order to achieve sufficient adhesion to a glass surface, the glass surface preferably has a water contact angle of 15° or less, more preferably 10° or less.

In other words, in order to achieve sufficient adhesion to a surface of the inorganic substrate, it is important to remove contaminants from the surface. As an indicator, the intrinsic water contact angle of a surface of the inorganic substrate ±10° tends to be a preferred range, and ±5° tends to be a more preferred range.

Examples of a method for applying a primer composition according to the present invention to a surface of an inorganic substrate and a method for applying an acrylic paint containing a compound to which one or more groups having a (meth)acryloyl carbon-carbon double bond in one molecule are bonded to a surface of the primer layer include a brushing method, a spray coating method, a wire bar method, a bar coater method, a blade method, a roll coating method, a spin coating method, a dipping method, and other known coating methods.

A primer composition according to the present invention generally contains a compound in which at least part of an alkoxy group bonding to a silicon atom of an alkoxysilyl group derived from the (b) component is converted into a hydroxy group by hydrolysis. Heating the primer composition causes dehydration condensation of hydroxy groups bonding to silicon atoms, dehydration condensation between a hydroxy group on a surface of an inorganic substrate, such as a glass plate, and a hydroxy group bonding to a silicon atom, and hydrolysis of a residual alkoxy group by water produced and additional dehydration condensation, thereby curing the primer composition to form a primer layer.

The heat-curing conditions generally include a temperature range of normal temperature to 200° C. and a time range of 0.01 to 240 hours. The curing temperature is preferably somewhat high to reduce the curing time. In this case, conditions for the formation of a primer layer are approximately 50° C. to 180° C. for 1 to 480 minutes, more preferably 80° C. to 150° C. for 5 to 240 minutes, still more preferably 100° C. to 130° C. for 10 to 180 minutes. An excessively high heat-curing temperature sometimes results in a longer cooling time, decreasing productivity. Although a primer composition may be heat-cured in the air or in an atmosphere of an inert gas, such as nitrogen, heat-curing in the air is preferred because of convenience. Although a primer composition may be heat-cured under atmospheric pressure or under reduced pressure, heat-curing under atmospheric pressure is preferred because of convenience.

The thickness of a primer layer thus layered on a surface of an inorganic substrate is appropriately determined for each purpose and ranges from approximately 0.01 to 20 μm, preferably 0.05 to 10 μm, more preferably 0.1 to 3 μm.

A coating film containing an acrylic resin formed on a primer layer according to the present invention refers to a coating film containing a resin produced by the polymerization of an acrylic paint containing a compound having in one molecule one or more groups having a (meth)acryloyl carbon-carbon double bond.

Examples of a compound having in one molecule one or more groups having a (meth)acryloyl carbon-carbon double bond contained in an acrylic paint include compounds having one or more (meth)acryloyl groups in one molecule, compounds having one or more (meth)acryloyloxy groups in one molecule, compounds having one or more (meth)acryloylthio groups in one molecule, and compounds having one or more (meth)acrylamide groups in one molecule.

Among these compounds, compounds having one or more (meth)acryloyloxy groups in one molecule tend to be preferred because of high polymerization reactivity, low coloring, and a weak malodor.

Examples of the compounds having one or more (meth)acryloyloxy groups in one molecule include compounds having one (meth)acryloyloxy group in one molecule, such as (meth)acrylic acid, sodium (meth)acrylate, hydroxyethyl (meth)acrylate, poly(ethylene glycol) (meth)acrylate, tetrafluoropropyl (meth)acrylate, β-carboxyethyl (meth)acrylate, ethylene oxide (EO)-modified succinic acid (meth)acrylate (Shin Nakamura Chemical Co., Ltd. "NKester A-SA", etc.), tetrahydrofurfuryl (meth)acrylate, imide (meth)acrylate (Toagosei Co., Ltd., "TO-1534", etc.), mono{(meth) acryloyloxyethyl}phosphoric acid, sodium 2-sulfoethyl (meth)acrylate, potassium 2-sulfoethyl (meth)acrylate, sodium 3-sulfopropyl (meth)acrylate, potassium 3-sulfopropyl (meth)acrylate; compounds having two (meth)acryloyloxy groups in one molecule, such as ethylene glycol di(meth)acrylate, poly(ethylene glycol) di(meth)acrylate, poly(propylene glycol) di(meth)acrylate, poly(butylene glycol) di(meth)acrylate, hexanediol di(meth)acrylate, nonanediol di(meth)acrylate, neopentyl glycol di(meth)acrylate, hydroxypivalate neopentyl glycol di(meth)acrylate, caprolactone-modified hydroxypivalate neopentyl glycol di(meth) acrylate (Nippon Kayaku Co., Ltd., "Kayarad HX-220", etc.), polyester di(meth)acrylate (Dai-ichi Kogyo Seiyaku, "New Frontier R-2201", etc.), triglycerol di(meth)acrylate (Kyoeisha Chemical Co., Ltd., "Epoxyester 80-MFA", etc.), zinc diacrylate, neopentyl glycol-modified trimethylolpropane di(meth)acrylate (Nippon Kayaku Co., Ltd., "Kayarad "R-604"", tricyclodecane di(meth)acrylate, ethylene oxide (EO)-modified bisphenol A di(meth)acrylate (Toagosei Co., Ltd., "Aronix M-210", etc.), epichlorohydrin-modified phthalic acid di(meth)acrylate (Nagase Chemicals Ltd., "DA-721"), epichlorohydrin-modified hexahydrophthalic acid di(meth)acrylate (Nagase Chemicals Ltd., "DA-722"), bis{(meth)acryloyloxyethyl}phosphoric acid, 2,2-bis{((meth)acryloyloxymethyl)}propionic acid-3-sulfopropyl ester sodium salt, 2,2-bis{((meth)acryloyloxymethyl)}propionic acid-3-sulfopropylester potassium salt, 2,2-bis{((meth)acryloyloxymethyl)}butyric acid-3-sulfopropylester sodium salt, and 2,2-bis{((meth)acryloyloxymethyl)}butyric acid-3-sulfopropylester potassium salt; compounds having three or more (meth)acryloyloxy groups in one molecule, such as ethylene oxide (EO)-modified glycerin tri(meth)acrylate (Dai-ichi Kogyo Seiyaku Co., Ltd., "New Frontier GE-3A", etc.), propylene oxide (PO)-modified glycerin tri(meth)acrylate (Nippon Kayaku Co., Ltd., "Kayarad GPO (propylene oxide)-303", etc.), epichlorohydrin-modified glycerin tri(meth)acrylate (Nagase Chemicals Ltd., "Denacol acrylate DA-314", etc.), trimethylolpropane tri(meth)acrylate, ditrimethylolpropane tetra(meth)acrylate, pentaerythritol tri(meth)acrylate, pentaerythritol tetra(meth)acrylate, ethylene oxide (EO)-modified pentaerythritol tetra(meth)acrylate (Kayaku Sartomer Co., Ltd., "SR-494", Shin Nakamura Chemical Co., Ltd., NKester ATM-35E, etc.), dipentaerythritol penta(meth)acrylate (Shin Nakamura Chemical Co., Ltd., NKester A-9530), dipentaerythritol hexa(meth)acrylate (Shin Nakamura Chemical Co., Ltd., NKester A-DPH), caprolactone-modified dipentaerythritol hexa(meth)acrylate (Nippon Kayaku Co., Ltd., "Kayarad DPCA-30", etc.), tris{(meth)acryloyloxyethyl}isocyanurate, caprolactone-modified tris{(meth)acryloyloxyethyl}isocyanurate (Shin Nakamura Chemical Co., Ltd., A-9300-1CL), and tris{(meth)acryloyloxyethyl}phosphoric acid; urethane(meth)acrylate compounds, such as a reaction product between hydroxyethyl (meth)acrylate and hexamethylene diisocyanate, a reaction product between hydroxyethyl (meth)acrylate and bis(4-isocyanatocyclohexyl)methane, a reaction product between hydroxyethyl (meth)acrylate and isophorone diisocyanate, a reaction product between 2-hydroxypropyl (meth)acrylate and bis(isocyanatomethyl)norbornane, a reaction product between poly(ethylene glycol) (meth)acrylate and hexamethylene diisocyanate, a reaction product of poly(ethylene glycol) (meth)acrylate and bis(4-isocyanatocyclohexyl)methane, a reaction product of poly(ethylene glycol) (meth)acrylate and isophorone diisocyanate, a reaction product between pentaerythritol tri(meth)acrylate and hexamethylene diisocyanate, a reaction product between pentaerythritol tri(meth)acrylate and isophorone diisocyanate, a reaction product between dipentaerythritol penta(meth)acrylate and a hexamethylene diisocyanate trimer, Shin Nakamura Chemical Co., Ltd. "U-2PPA", Shin Nakamura Chemical Co., Ltd. "U-6HA", Shin Nakamura Chemical Co., Ltd. "U-6LPA", Shin Nakamura Chemical Co., Ltd. "UA-32P", Shin Nakamura Chemical Co., Ltd. "UA-NDP", Shin Nakamura Chemical Co., Ltd. "U-108A", Shin Nakamura Chemical Co., Ltd. "UA-511", Shin Nakamura Chemical Co., Ltd. "UA-4200", Shin Nakamura Chemical Co., Ltd. "UA-340P", Shin Nakamura Chemical Co., Ltd. "UA-160TM", Shin Nakamura Chemical Co., Ltd. "UA-6200", Shin Nakamura Chemical Co., Ltd. "U-108", Shin Nakamura Chemical Co., Ltd. "UA-122P", Shin Nakamura Chemical Co., Ltd. "UA-512", Shin Nakamura Chemical Co., Ltd. "UA-W2A", Shin Nakamura Chemical Co., Ltd. "UA-7000", Shin Nakamura Chemical Co., Ltd. "UA-7200", Toagosei Co., Ltd. "M-1200", Toagosei Co., Ltd. "M-1600", Toagosei Co., Ltd. "M-1960", and the like; polyester (meth)acrylate compounds, such as Toagosei Co., Ltd. "Aronix M-6200", Toagosei Co., Ltd. "Aronix M-6500", Toagosei Co., Ltd. "Aronix M-7100", Toagosei Co., Ltd. "Aronix M-8030", Toagosei Co., Ltd. "Aronix M-8530", Toagosei Co., Ltd. "Aronix M-8560", Toagosei Co., Ltd. "Aronix M-9050", Daicel-UCB Company, Ltd. "Ebcryl80", BASF "Laromer PE56F", Mitsubishi Rayon Co., Ltd. "Diabeam UK-4003", Hitachi Chemical Co., Ltd. "Hitaloid 7831", and the like. The compounds having in one molecule one or more groups having a (meth)acryloyl carbon-carbon double bond may be used alone or in combination.

Preferably, an acrylic paint contains a radiation-curing acrylate compound (I) because such an acrylic paint can be cured using rays, such as ultraviolet rays, and the curing process can be shortened.

Preferably, the acrylate compound (I) has a hydrophilic group to improve the hydrophilicity of a coating film. Examples of the hydrophilic group of the acrylate compound (I) include a carboxy group, a phosphate group, and a sulfone group. Among these, a sulfone group is particularly preferred.

The acrylate compound (I) is specifically represented by the following formula (13).

[Formula 13]

(In the formula (13), s denotes 1 or 2, l denotes 1 or 2, and m denotes 0 or 1. M1 and M2 denote the same or different hydrogen ions, ammonium ions, alkali metal ions, or alkaline-earth metal ions.) The compound represented by the formula (13) is electrically neutral. X denotes a structure having a hydrophilic group represented by any of the following formulae (14) to (16).

[Formula 14]

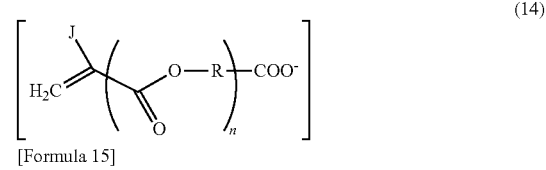

[Formula 15]

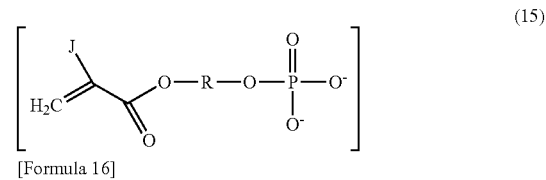

[Formula 16]

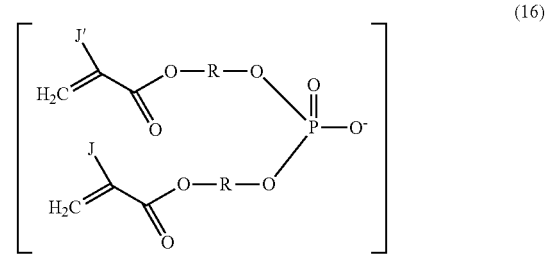

(In the formulae (14) to (16), J and J' denote the same or different H or $CH_3$, and R' denotes an aliphatic hydrocarbon group having 1 to 600, preferably 2 to 100, more preferably 2 to 20, carbon atoms and may have an aromatic ring, an aliphatic cyclic group, an ether group, or an ester group. M denotes a hydrogen ion, an alkali metal ion, or an alkaline-earth metal ion. If M denotes a hydrogen ion or an alkali metal ion, n is 1, and if M denotes an alkaline-earth metal ion, n is 2.)

As described above, the acrylate compound (I) preferably has a sulfone group as a hydrophilic group and is, more specifically, represented by the following formula (17) or (18).

[Formula 17]

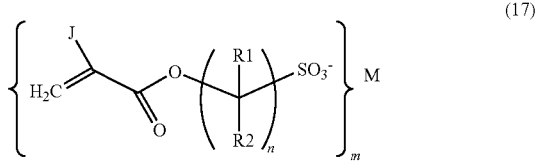
(17)

[Formula 18]

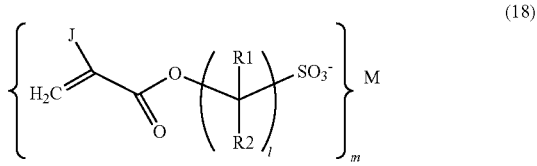
(18)

In the formulae (17) and (18), J denotes H or CH3. R1 and R2 independently denote H, CH3, or an ethyl group, H being preferred because of ease of synthesis. n denotes an integer in the range of 1 to 6, preferably 2 to 4 also because of ease of synthesis. m denotes an integer of 1 or 2. M denotes H, an amine, an alkali metal, or an alkaline-earth metal.

The amine may be ammonia, a primary amine, a secondary amine, or a tertiary amine. Among these, ammonia, methylamine, dimethylamine, triethylamine, and the like are relatively preferred.

Examples of the alkali metal include lithium, sodium, potassium, and rubidium. Examples of the alkaline-earth metal include beryllium, magnesium, calcium, and strontium.

Among H, amines, alkali metals, and alkaline-earth metals, univalent alkali metals are preferred, and sodium, potassium, and rubidium are more preferred.

Among the acrylate compounds (I) represented by the formulae (17) and (18), 2-sulfonylethyl (meth)acrylate, 3-sulfonylpropyl (meth)acrylate, 4-sulfonylbutyl (meth) acrylate, and alkali metal salts and alkaline-earth metal salts thereof are preferred.

The acrylate compound (I) represented by the formula (17) or (18) preferably has a molecular weight in the range of 168 to 18,000, more preferably 180 to 1,000, still more preferably 200 to 500.

The acrylate compounds (I) represented by the formulae (13), (17), and (18) may be used alone or in combination.

In the acrylic paint, a polymerization initiator can be appropriately determined in accordance with means for polymerizing the paint. Examples of the polymerization initiator include thermal polymerization initiators and radiation-induced polymerization initiators.

Among the radiation-induced polymerization initiators, UV polymerization initiators are preferably used. Examples of the UV polymerization initiators include Esacure One (Lamberti S.p.A.), Esacure KT55 (Lamberti S.p.A.), Esacure KT046 (Lamberti S.p.A.), Irgacure 184 (Chiba Specialty Chemicals Co., Ltd.), Irgacure 1173 (Chiba Specialty Chemicals Co., Ltd.), Irgacure 500 (Chiba Specialty Chemicals Co., Ltd.), Irgacure 819 (Chiba Specialty Chemicals Co., Ltd.), Darocure TPO (Chiba Specialty Chemicals Co., Ltd.), and other known UV polymerization initiators.

The amount of polymerization initiator to be added ranges from approximately 0.1% to 10% by weight, preferably 0.3% to 5% by weight, more preferably 1% to 4% by weight, of the total amount of compound having one or more groups having a (meth)acryloyl carbon-carbon double bond.

If necessary, the acrylic paint may also contain a solvent for the purposes of solubility adjustment, viscosity adjustment, and ensuring leveling. Examples of the solvent include hydrocarbon solvents, such as hexane, toluene, and xylene, halogen solvents, such as methylene chloride, chloroform, dichloroethane, chlorobenzene, and dichlorobenzene, alcohols, such as methanol, ethanol, isopropanol (IPA), n-butanol, and methoxyethanol, aprotic polar solvents, such as acetonitrile, DMF, and DMSO, ester solvents, such as ethyl acetate, butyl acetate, and isoamyl acetate, ketone solvents, such as acetone, methyl ethyl ketone, and methyl isobutyl ketone, water, and mixed solvents thereof.

The acrylic paint may also contain other additive agents. Examples of the additive agents include a polymerization accelerator, an ultraviolet absorber, an infrared absorber, a catalyst, a hindered amine light stabilizer (HALS), a radical scavenger, an antioxidant, a polymerization inhibitor, coloring matter, a metal deactivator, a storage stability improver, pigment, dye, a filling material, filler, and a binder. The additive agents can be added within the bounds of not impairing the adhesion to a primer layer formed in accordance with the present invention and the performance of an acrylic paint.

In order to prevent deterioration in the hydrophilicity and adhesion of an acrylic paint, the acrylic paint preferably contains no additive agent that causes deterioration in the hydrophilicity and adhesion. For example, the acrylic paint more preferably contains no additive agent other than filling materials, such as colloidal silica, a catalyst, a hindered amine light stabilizer (HALS), and the like.

The acrylic paint is applied to a primer layer and is polymerized to form a coating film containing an acrylic resin on the primer layer. A method for polymerizing the acrylic paint is not particularly limited and can be appropriately selected in accordance with an initiator to be used. In general, the polymerization can be performed using heat or radiation, or even both.

The polymerization of paint can be performed in the air or in an atmosphere of an inert gas, such as nitrogen. In spite of complicated procedures and complicated apparatuses, a polymerization reaction in an inert gas atmosphere can reduce the polymerization time or the radiation energy.

In the case of using heat, a radical generator, such as an organic peroxide, is added to the composition, and the composition is heated at a temperature in the range of room temperature to 300° C.

In the case of using radiation, the rays may be energy beams having a wavelength in the range of 0.0001 to 800 nm and are classified into, for example, an α ray, a β ray, a γ ray, X-rays, an electron beam, ultraviolet rays, and visible light. These rays can be appropriately selected in accordance with the composition.

Among these rays, 200 to 450 nm ultraviolet rays are preferred. When ultraviolet rays having an output peak more preferably in the range of 370 to 445 nm, still more preferably 370 to 430 nm, particularly preferably 370 to 400 nm are used, defects, such as yellowing and thermal deformation, rarely occur during polymerization, and even if an ultraviolet absorber is added, the polymerization can be completed in a relatively short period of time.

The thickness of a coating film containing an acrylic resin formed from an acrylic paint on a primer layer is appropriately determined for each purpose and ranges from approximately 0.1 to 100 μm, preferably 0.5 to 20 μm, more preferably 1 to 10 μm.

In the case that the paint is a mixed paint that contains the acrylic paint and an additional paint (B), such as an epoxy paint, a polyester paint, a urethane paint, polyamide paint, or a polyolefin paint, a layered coating film is preferably a graded film in which the concentration of hydrophilic groups, such as a sulfo group, derived from the radiation-curing acrylate increases from the primer layer side to the surface of the layered film. The graded film refers to a film in which the component ratio continuously alters from the primer layer side to the surface of the layered film.

Such a graded film can be formed by various means. For example, a mixed paint that contains an acrylate compound (I) represented by the formula (17) or (18) and a compound having two or more (meth)acryloyl groups in one molecule (acrylate compound (II)), which is a crosslinking polymerizable compound, can be applied, dried, and then cured by UV or heat to form a graded film.

The mixing ratio of the acrylate compound (I) to the acrylate compound (II) ranges from 80:20 to 0.1:99.9, preferably 50:50 to 0.2:99.8, more preferably 30:70 to 0.3:99.7, still more preferably 20:80 to 0.4:99.6, by weight ratio. Examples of a polymerizable functional group of the acrylate compound (II), a (meth)acryloyl group, include a (meth)acryloyloxy group, a (meth)acryloylthio group, and a (meth) acrylamide group. Among these groups, a (meth)acryloyloxy group or a (meth)acryloylthio group is preferred.

Examples of more preferred compounds among the compounds having two or more (meth)acryloyl groups in one molecule include compounds having one or more hydroxy groups and two or more (meth)acryloyl groups in one molecule, compounds having one or more ether or thioether bonds and two or more (meth)acryloyl groups in one molecule, compounds having one or more aliphatic or aromatic ring structures and two or more (meth)acryloyl groups in one molecule, and compounds having one or more heterocyclic structures and two or more (meth)acryloyl groups in one molecule.

Specific examples of the acrylate compound (II) include ethylene glycol di(meth)acrylate, 1,2-propanediol di(meth)acrylate, 1,3-propanediol di(meth)acrylate, 1,4-butanediol di(meth)acrylate, 1,6-hexanediol di(meth)acrylate, 1,9-nonanediol di(meth)acrylate, 1,10-decanediol di(meth)acrylate, neopentyl glycol di(meth)acrylate, methyl-1,8-octanediol di(meth)acrylate, 2-butyl-2-ethyl-1,3-propanediol di(meth)acrylate, 1,2-bis{3-(meth)acryloyloxy-2-hydroxy-propyloxy}ethane, 1,2-bis{3-(meth)acryloyloxy-2-hydroxy-propyloxy}propane, 1,3-bis{3-(meth)acryloyloxy-2-hydroxy-propyloxy}propane, 1,4-bis{3-(meth)acryloyloxy-2-hydroxy-propyloxy}butane, 1,6-bis{3-(meth)acryloyloxy-2-hydroxy-propyloxy}hexane neopentyl glycol hydroxypivalic acid di(meth)acrylate, poly(ethylene glycol) di(meth)acrylate, 1,2-poly(propylene glycol) di(meth)acrylate, 1,3-poly(propylene glycol) di(meth)acrylate, 1,4-poly(butylene glycol) di(meth)acrylate, poly(ethylene glycol)-bis{3-(meth)acryloyloxy-2-hydroxy-propyl}ether, 1,2-poly(propylene glycol)-bis{3-(meth)acryloyloxy-2-hydroxy-propyl}ether, 1,2-poly(propylene glycol)-bis{(meth)acryloyl-poly(oxyethylene)}ether, 1,3-poly(propylene glycol) di(meth)acrylate, 1,4-poly(butylene glycol) di(meth)acrylate, 1,4-poly(butylene glycol)-bis{3-(meth)acryloyloxy-2-hydroxy-propyl}ether, bis{2-(meth)acryloylthio-ethyl}sulfide, bis{5-(meth)acryloylthio-3-thiapentyl}sulfide, bis{2-(meth)acryloyloxy-ethyl}phosphoric acid, bis{3-(meth)acryloyloxy-propyl}phosphoric acid, bis{4-(meth)acryloyloxy-butyl}phosphoric acid, bis{6-(meth)acryloyloxy-hexyl}phosphoric acid, cyclohexanediol di(meth)acrylate, bis{(meth)acryloyloxy-methyl}cyclohexane, bis{7-(meth)acryloyloxy-2,5-dioxaheptyl}cyclohexane, bis{(meth)acryloyloxy-poly(ethyleneoxy)-methyl}cyclohexane, tricyclo-decanedimethanol di(meth)acrylate, 2-propenoic acid {2-(1,1,-dimethyl-2-{(1-oxo-2-propenyl)oxy}ethyl)-5-ethyl-1,3-dioxane-5-yl}methyl ester (manufactured by Nippon Kayaku Co., Ltd., trade name "KAYARAD R-604"), N,N',N"-tris{2-(meth)acryloyloxy-ethyl}isocyanurate, xylylenediol di(meth)acrylate, bis{7-(meth)acryloyloxy-2,5-dioxaheptyl}benzene, bis{(meth)acryloyloxy-poly(ethyleneoxy)-methyl}benzene, bisphenol A di(meth)acrylate, bis{(meth)acryloyl-oxyethyl}bisphenol A, bis{(meth)acryloyl-oxypropyl}bisphenol A, bis{(meth)acryloyl-poly(oxyethylene)}bisphenol A, bis{(meth)acryloyl-poly(oxy-1,2-propylene)}bisphenol A, bis{3-(meth)acryloyloxy-2-hydroxy-propyl}bisphenol A, bis{3-(meth)acryloyloxy-2-hydroxy-propyl-oxyethyl}bisphenol A, bis{3-(meth)acryloyloxy-2-hydroxy-propyl-oxypropyl}bisphenol A, bis{3-(meth)acryloyloxy-2-hydroxy-propyl-poly(oxyethylene)}bisphenol A, bis{3-(meth)acryloyloxy-2-hydroxy-propyl-poly(oxy-1,2-propylene)}bisphenol A, bis{(meth)acryloyl-oxyethyl-oxypropyl}bisphenol A, bis{(meth)acryloylpoly(oxyethylene)-poly(oxy-1,2-propylene)}bisphenol A, naphthalenediol di(meth)acrylate, bis{3-(meth)acryloyloxy-2-hydroxy-propyl-oxy}naphthalene, 9,9-fluorenediol di(meth)acrylate, 9,9-bis{4-(2-(meth)acryloyloxy-ethyl-oxy)} fluorene, 9,9-bis{3-phenyl-4-(meth)acryloyloxy-poly(ethyleneoxy)}fluorene, phenol novolak-type epoxy (meth)acrylate (manufactured by hin Nakamura Chemical Co., Ltd., trade name "NKoligo EA-6320, EA-7120, EA-7420"), glycerin-1,3-di(meth)acrylate, 1-acryloyloxy-2-hydroxy-3-methacryloyloxy-propane, 2,6,10-trihydroxy-4,8-dioxaundecane-1,11-di(meth)acrylate, 1,2,3-tris{3-(meth)acryloyloxy-2-hydroxy-propyl-oxy}propane, 1,2,3-tris{2-(meth)acryloyloxy-ethyl-oxy}propane, 1,2,3-tris{2-(meth)acryloyloxy-propyl-oxy}propane, 1,2,3-tris{(meth)acryloyloxy-poly(ethyleneoxy)}propane, 1,2,3-tris{(meth)acryloyloxy-poly(1,2-propyleneoxy)}propane, trimethylolpropane tri(meth)acrylate, trimethylolpropane-tris{(meth)acryloyloxy-ethyl-oxy}ether, trimethylolpropane-tris{2-(meth)acryloyloxy-propyl-oxy}ether, trimethylolpropane-tris{(meth)acryloyloxy-poly(ethyleneoxy)}ether, trimethylolpropane-tris{(meth)acryloyloxy-poly(1,2-propyleneoxy)}ether, pentaerythritol tri(meth)acrylate, pentaerythritol tetra(meth)acrylate, pentaerythritol-tetrakis{(meth)acryloyloxy-ethyl-oxy}ether, pentaerythritol-tetrakis{2-(meth)acryloyloxy-propyl-oxy}ether, pentaerythritol-tetrakis{(meth)acryloyloxy-poly(ethyleneoxy)}ether, pentaerythritol-tetrakis{(meth)acryloyloxy-poly(1,2-propyleneoxy)}ether, ditrimethylolpropane tetra(meth)acrylate, ditrimethylolpropane-tetrakis{(meth)acryloyloxy-ethyl-oxy}ether, ditrimethylolpropane-tetrakis{2-(meth)acryloyloxy-propyl-oxy}ether, ditrimethylolpropane-tetrakis{(meth)acryloyloxy-poly(ethyleneoxy)}ether, ditrimethylolpropane-tetrakis{(meth)acryloyloxy-poly(1,2-propyleneoxy)}ether, dipentaerythritol penta(meth)acrylate, dipentaerythritol hexa(meth)acrylate, dipentaerythritol-hexa{(meth)acryloyloxy-ethyl-oxy}ether, dipentaerythritol-hexa{2-(meth)acryloyloxy-propyl-oxy}ether, dipentaerythritol-hexa{(meth)acryloyloxy-poly(ethyleneoxy)}ether, dipentaerythritol-hexa{(meth)acryloyloxy-poly(1,2-propyleneoxy)}ether or a urethane reaction product between 2-hydroxyethyl (meth)acrylate, 2-hydroxypropyl (meth)acrylate, 3-hydroxypropyl (meth)acrylate or 4-hydroxybutyl (meth)acrylate and hexamethylene diisocyanate, the corresponding urethane reaction product with isophorone diisocyanate, the corresponding urethane reaction product with bis(isocyanatomethyl)norbornane, the corresponding urethane reaction product with bis(4-isocyanatocyclohexyl)methane, the corresponding urethane reaction product with 1,3-bis(isocyanatomethyl)cyclohexane, and the corresponding urethane reaction product with m-xylylene diisocyanate.

The concentration of a hydrophilic group derived from the acrylate can be determined by physically cutting a sample from a graded film and measuring the resin composition of the sample, for example, by FI-IR spectroscopy or time-of-flight secondary ion mass spectrometry (TOF-SIMS).

In this manner, a layered product composed of an inorganic substrate, a primer layer, and a coating film containing an acrylic resin is produced. The layered product may be a film, a sheet, or a molded product. The layered product is preferably used as a coated product that includes a primer layer and an acrylic resin layer on an inorganic substrate.

For example, a layered product produced in accordance with the present invention can be used as a coated product for use in external walls, exteriors, inner walls, interiors, and floors of buildings, ships, aircrafts, and vehicles. A layered product produced in accordance with the present invention can also be used as a coated product for use in clothing materials, such as clothes, cloths, and fibers; optics, such as optical films, optical disks, glasses, contact lenses, and goggles; displays, such as flat panels and touch panels, and display materials thereof; glass substrates of solar cells or outermost protective transparent plates of solar cells; illuminators, such as lamps and lights, and illuminating components thereof; cooling fins of heat exchangers, cosmetic containers and container materials thereof, reflective materials, such as reflective films and reflective plates, sound barriers placed in expressways, windowpanes, mirrors, furniture, furniture materials, bathroom materials, kitchen utensils, ventilating fans, pipes, wires, electrical appliances, and electrical components.

Depending on the purpose, a surface of a layered product according to the present invention may be surface-treated by physical treatment, such as corona treatment, flame treatment, plasma treatment, ozone treatment, low-temperature plasma treatment using oxygen or nitrogen gas, and glow discharge treatment, and chemical treatment, such as oxidation by an oxidizing agent and etching by an acid or alkaline, may be covered with an inorganic material, such as ITO or silica, or may be coated with another paint to be covered with an organic material, such as resin.

EXAMPLES

The present invention will now be further illustrated with examples and comparative examples. However, the present invention is not limited to these examples. In the following tables (Tables 7 to 9), an up-arrow (↑) means that the datum is the same as the directly above datum.

Production Example 1

Preparation of Acrylic Paint 1

0.84 g of 3-sulfopropyl acrylate potassium salt (abbreviated as SPA-K), 0.10 g of a hindered amine light stabilizer (HALS) Nylostab S-EED (Clariant (Japan) K.K.), and 25.2 g of methanol are mixed with stirring under ultrasonic wave. The resulting liquid mixture was sufficiently mixed with 10.0 g of A-GLY-9E and then with 90.0 g of U-15HA to prepare a uniform [composition 1] having a solid content of 80%.

TABLE 3

Composition 1

| No. | Component | Amount (g) | Concentration (wt %) | Note |
|---|---|---|---|---|
| 1 | SPA-K | 0.84 | 0.67 | |
| 2 | A-GLY-9E | 10.0 | 7.93 | |
| 3 | U-15HA | 90.0 | 71.33 | |
| 4 | S-EED | 0.10 | 0.08 | HALS |
| 5 | Methanol | 25.2 | 20.00 | Solvent 1 |
| | Total | 126.2 | 100.00 | |

Solids (wt %) = 80

[Formula 19]

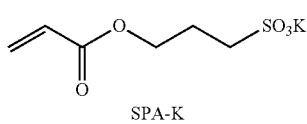

SPA-K

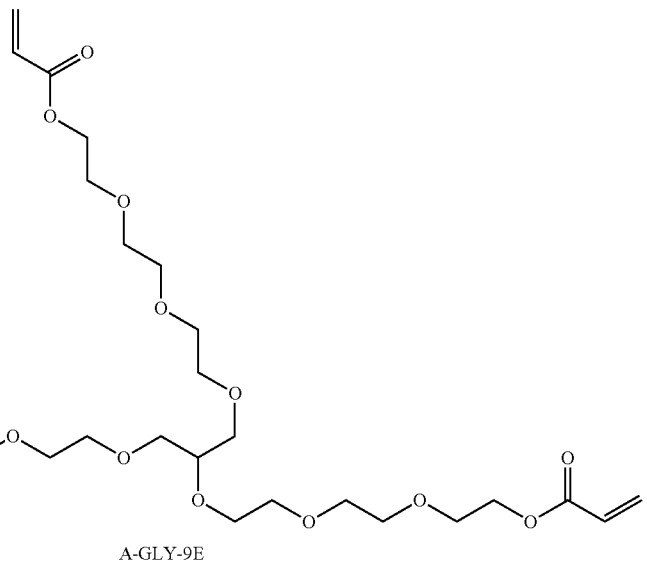

A-GLY-9E

-continued

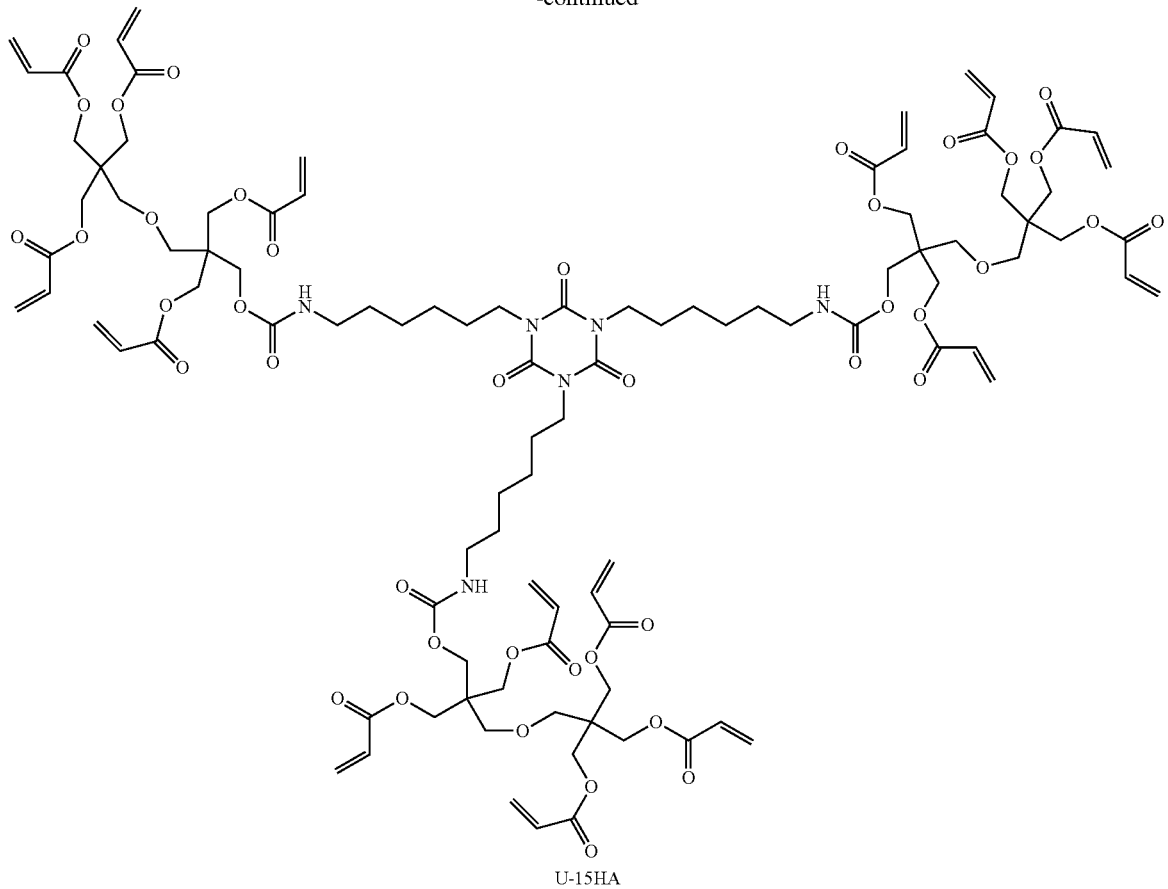
U-15HA 10 g of the resulting [80% composition 1] was mixed with 0.24 g (3% by weight) of a UV polymerization initiator Esacure KT046 (Lamberti S.p.A.) and 17.2 g of a solvent methoxyethanol to prepare a uniform [acrylic paint 1] having a solid content of 30%.

TABLE 4

Acrylic Paint 1

| No. | Component | Amount (g) | Concentration (wt %) | Note |
|---|---|---|---|---|
| 1 | SPA-K | 0.067 | 0.24 | |
| 2 | A-GLY-9E | 0.793 | 2.89 | |
| 3 | U-15HA | 7.133 | 25.97 | |
| 4 | S-EED | 0.008 | 0.03 | HALS |
| 5 | Methanol | 2.000 | 7.28 | Solvent 1 |
| 6 | KTO-46 | 0.24 | 0.87 | UV polymerization initiator |
| 7 | Methoxyethanol | 17.2 | 62.71 | Solvent 2 |
| | Total | 27.5 | 100.00 | |

Solids (wt %) = 30

Example 1

Production of Primer 1

7.8 g (16.0 mmol, molecular weight 488.7) of a first essential component [(a) component] pentaerythritol-tetrakis(3-mercaptopropionate) (abbreviated as PEMP), 5.0 g (21.3 mmol, molecular weight 234.3) of a second essential component [(b) component] 3-acryloylpropyl-trimethoxysilane ([compound 1] in Table 1), 57.6 g of ethanol, and 57.6 g of methanol were mixed at room temperature for 20 hours to prepare a uniform [composition 1 for primer] having a solid content of 10%. The component molar ratio of the first essential component [(a) component]/the second essential component [(b) component] is 10/13, and the functional group molar ratio of [SH group]/[group reactive with SH group of (b) component] is 10/3.3.

TABLE 5

| | | | | Number | |
| | | Amount | Molecular | of moles | |
| No. | Component | (g) | Weight | (mmol) | Note |
|---|---|---|---|---|---|
| 1 | PEMP | 7.8 | 488.7 | 16.0 | (a) component |
| 2 | Compound 1 | 5.0 | 234.3 | 21.3 | (b) component |
| 3 | Ethanol | 57.6 | | | Solvent 1 |
| 4 | Methanol | 57.6 | | | Solvent 2 |
| | Total | 128.0 | Molar ratio = | 0.75 | (a) component/(b) component |
| | Solids (wt %) = 10 | | Molar ratio = | 3.00 | SH group/group reactive with SH of (b) component |

[Formula 20]

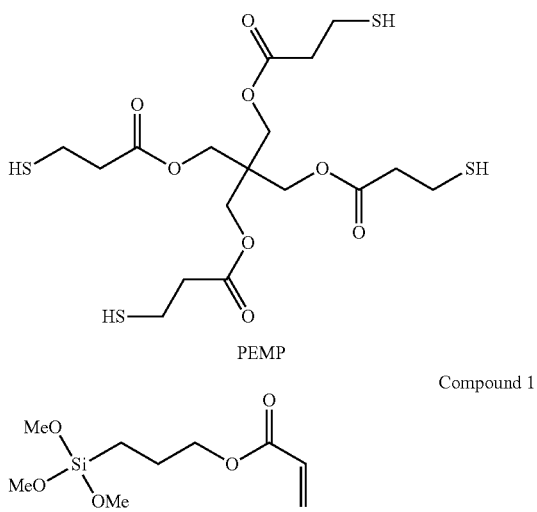

PEMP

Compound 1

1.28 g (10% by weight of [(a) component]+[(b) component]) of acetic acid, 3.4 g of water, and 128.0 g of methanol were added to the [composition 1 for primer] as a hydrolysis and sol-gel curing reaction catalyst. The mixture was hydrolyzed at room temperature for three hours to prepare a uniform primer 1 having a solid content of 5%.

surface of a glass plate (having a surface water contact angle in the range of 57° to 70°) having a thickness of 2 mm was rubbed with the cloth. The glass plate was then washed with water to remove most abrasive. After the glass plate was again rubbed with a new piece of cloth [Bemcot M-3] (Asahi Kasei Co.), the glass plate was again washed with water to completely remove the abrasive from the surface. Finally, the cleaned surface of the glass plate after dried using an airbrush had a water contact angle in the range of 5° to 6° at any point.

Coating Test and Evaluation Results

A glass plate having a water contact angle in the range of 5° to 6° was sprayed with the [primer 1] and was heat-dried in an oven at 120° C. for one hour to form a primer layer on the surface. The primer layer had a thickness of approximately 0.5 μm.

After cooling, a [composition 1 for acrylic resin] was applied to the primer layer with a bar coater, was dried with a hot air dryer at a temperature in the range of 40° C. to 50° C. for five minutes, and was passed through a UV conveyer {Fusion UV Systems Japan K.K., an electrodeless discharge lamp D valve, illuminance 6600 mW/cm$^2$} at a conveyer speed of 6 m/min (the integrated amount of light 1000 mJ·cm$^2$) to form an acrylic resin layer on the primer layer. The acrylic resin layer had a thickness of approximately 3 μm, was transparent and hard, and was not sticky at all. Tables 7 and 8 show evaluation results.

TABLE 6

| | | | | Number of | |
| | | Amount | Molecular | moles | |
| No. | Component | (g) | Weight | (mmol) | Note |
|---|---|---|---|---|---|
| 1 | PEMP | 7.8 | 488.7 | 16.0 | (a) component |
| 2 | Compound 1 | 5.0 | 234.3 | 21.3 | (b) component |
| 3 | Ethanol | 57.6 | | | Solvent 1 |
| 4 | Methanol | 185.6 | | | Solvent 2 |
| 5 | Water | 3.4 | 18.0 | 188.7 | 3 eq. (per alkoxy group bonded to silica) |
| 6 | Acetic acid | 1.28 | | | Catalyst |
| | Total | 247.9 | Molar ratio = | 0.75 | (a) component/(b) component |
| | Solids (wt %) = 5 | | Molar ratio = | 3.00 | SH group/group reactive with SH of (b) component |
| | *Catalyst (wt %) = 10 | | | | *relative to (a) component + (b) component |

Washing of Substrate

A proper amount of glass detergent [Hi-Shine HS-Namishiro] (Pionchemical Co.) was taken with a piece of cloth [Bemcot M-3] (Asahi Kasei Co.). With drops of water, a Example 2

A glass plate was washed in the same manner as in Example 1 except that the glass detergent [Hi-Shine HS- Namishiro] (Pionchemical Co.) was replaced by a neutral detergent "Family Fresh" (Kao Co.). The resulting glass surface had water contact angles in the range of 10° to 15° at five points of measurement. This glass plate was subjected to the same tests as in Example 1. Table 7 shows the evaluation results.

Reference Example 1

A glass plate was immersed in water and was irradiated with an ultrasonic wave having an output of 280 mW/cm$^2$ (frequency 38 kHz) for three minutes for washing. The resulting glass surface had water contact angles in the range of 27° to 36° at five points of measurement. This glass plate was subjected to the same tests as in Example 1. Table 7 shows the evaluation results.

Reference Example 2

Without being washed, a glass plate was subjected to the same tests as in Example 1. The glass surface had water contact angles in the range of 57° to 70° at five points of measurement. Table 7 shows the evaluation results.

Comparative Example 1

The same tests as in Example 2 were performed only using a [compound 1], which was the second essential component [(b) component]. Table 7 shows the evaluation results.

Comparative Example 2

The same tests as in Example 2 were performed using 3-mercaptopropyl-trimethoxysilane in place of the first essential component [(a) component] and the second essential component [(b) component]. Table 7 shows the evaluation results.

Comparative Example 3

The same tests as in Example 2 were performed using N-(2-aminoethyl)-N-(3-trimethoxysilyl-propyl)amine in place of the first essential component [(a) component] and the second essential component [(b) component]. Table 7 shows the evaluation results.

Comparative Example 4

The same tests as in Example 2 were performed using glycidyloxypropyl-trimethoxysilane [compound 11] in place of the first essential component [(a) component] and the second essential component [(b) component]. Table 7 shows the evaluation results.

Comparative Example 5

The same tests as in Example 2 were performed only using [PEMP], which was the first essential component [(a) component]. Table 7 shows the evaluation results.

Comparative Example 6

The acrylic resin described in Example 1 was directly applied to the glass plate described in Example 1 without performing primer treatment. Table 7 shows the evaluation results.

TABLE 7

| No. | Substrate | | Primer | | Paint | | | | Evaluation of layered product | | |
|---|---|---|---|---|---|---|---|---|---|---|---|
| | Type | Water contact angle (°) | (a) component | (b) component / Film Thickness (μm) | Type | Film Thickness (μm) | Appearance | ¹Adhesion | ²Scratch resistance | Water contact angle (°) |
| Example 1 | Glass | 5-6 | PEMP (pentaerythritol tetrakis(3-mercaptopropionate)) | Compound 1 (acryloyloxypropyl trimethoxysilane) / 0.5 | Acrylic Paint 1 | 3 | Transparent | 100/100 | ○ | 5 |
| Example 2 | ↑ | 10-15 | ↑ | ↑ / ↑ | ↑ | ↑ | ↑ | 100/100 | ○ | 5 |
| Reference Example 1 | ↑ | 27-36 | ↑ | ↑ / ↑ | ↑ | ↑ | ↑ | 40/100 | — | — |
| Reference Example 2 | ↑ | 57-70 | ↑ | ↑ / ↑ | ↑ | ↑ | ↑ | 0/100 | — | — |
| Comparative Example 1 | ↑ | 10-15 | None | Compound 1 / ↑ | ↑ | ↑ | ↑ | 50/100 | — | — |
| Comparative Example 2 | ↑ | 10-15 | None | (3-mercaptopropyl trimethoxysilane) / ↑ | ↑ | ↑ | ↑ | 0/100 | — | — |
| Comparative Example 3 | ↑ | 10-15 | None | (N-(2-aminoethyl)-3-aminopropyltrimethoxysilane) / ↑ | ↑ | ↑ | ↑ | 0/100 | — | — |
| Comparative Example 4 | ↑ | 10-15 | None | Compound 11 (glycidoxypropyl trimethoxysilane) / ↑ | ↑ | ↑ | ↑ | 0/100 | — | — |

TABLE 7-continued

| | Substrate | | Primer | | Paint | | | | | Evaluation of layered product | |
|---|---|---|---|---|---|---|---|---|---|---|---|
| No. | Type | Water contact angle (°) | (a) component | (b) component | Film Thickness (μm) | Type | Film Thickness (μm) | Appearance | ¹Adhesion | ²Scratch resistance | Water contact angle (°) |
| Comparative Example 5 | ↑ | 10-15 | 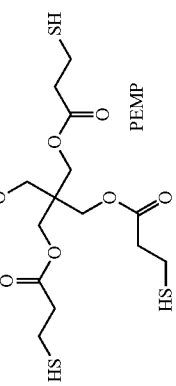 PEMP | None | ↑ | ↑ | ↑ | ↑ | 0/100 | — | — |
| Comparative Example 6 | ↑ | 5-6 | None | None | ↑ | ↑ | ↑ | ↑ | 0/100 | — | — |

¹Cross-cut adhesion test
²Steel wool #0000 × 1 kg load × back and forth 10 times, No scratch → ○ Scratches → X

Example 3

The same tests as in Example 1 were performed using 4-mercaptomethyl-3,6-dithiaoctane-1,8-dithiol (abbreviated as GST) as the first essential component [(a) component]. The component molar ratio of the first essential component [(a) component]/the second essential component [(b) component] is 10/13, and the functional group molar ratio of [SH group]/[group reactive with SH group of (b) component] is 10/4.4. Table 8 shows the evaluation results.

Example 4

The same tests as in Example 1 were performed using 4,8-bis(mercaptomethyl)-3,6,9-trithiaundecane-1,1'-dithiol (abbreviated as FSH) as the first essential component [(a) component] while the component molar ratio of the first essential component [(a) component]/the second essential component [(b) component] was altered to 10/15, and the functional group molar ratio of [SH group]/[group reactive with SH group of (b) component] was altered to 10/3.8. Table 8 shows the evaluation results.

Example 5

The same tests as in Example 1 were performed using pentaerythritol-tetrakis(thioglycolate) (abbreviated as PETG) as the first essential component [(a) component] while the component molar ratio of the first essential component [(a) component]/the second essential component [(b) component] was altered to 10/15, and the functional group molar ratio of [SH group]/[group reactive with SH group of (b) component] was altered to 10/3.8. Table 8 shows the evaluation results.

Example 6

The same tests as in Example 1 were performed using dipentaerythritol-hexakis(3-mercaptopropionate) (abbreviated as DPEMP) as the first essential component [(a) component] while the component molar ratio of the first essential component [(a) component]/the second essential component [(b) component] was altered to 10/30, and the functional group molar ratio of [SH group]/[group reactive with SH group of (b) component] was altered to 10/5.0. Table 8 shows the evaluation results.

Example 7

The same tests as in Example 6 were performed while the functional group molar ratio of [(a) component]/[(b) component] was altered to 4/1. Table 8 shows the evaluation results.

Example 8

The same tests as in Example 6 were performed using styryl-trimethoxysilane (compound 9) as the second essential component [(b) component] while the functional group molar ratio of [(a) component]/[(b) component] was altered to 3/1. Table 8 shows the evaluation results.

Example 9

The same tests as in Example 6 were performed using 2-(3,4-epoxy-cyclohexyl)ethyl-trimethoxysilane (compound 10) as the second essential component [(b) component] while the functional group molar ratio of [(a) component]/[(b) component] was altered to 3/1. Table 8 shows the evaluation results.

Example 10

The same tests as in Example 6 were performed using 3-glycidyloxy-propyl-trimethoxysilane (compound II) as the second essential component [(b) component] while the functional group molar ratio of [(a) component]/[(b) component] was altered to 3/1. Table 8 shows the evaluation results.

Example 11

The same tests as in Example 6 were performed while, in the production of the composition 1 for primer (addition reaction), the mixed solvent of methanol and ethanol was replaced by acetone, 3-isocyanato-propyl-triethoxysilane (compound 15) was used as the second essential component [(b) component], 0.3% by weight (of the total weight of the first essential component [(a) component] and the second essential component [(b)-component]) dibutyltin dilaurate was added as a urethane-forming catalyst, and the functional group molar ratio of [(a) component]/[(b) component] was altered to 3/1. Table 8 shows the evaluation results.

TABLE 8

| No. | Substrate | | Primer | |
|---|---|---|---|---|
| | Type | Water contact angle (°) | Constituent (a) component | Constituent (b) component |
| Example 1 | Glass | 5-6 | PEMP | Compound 1 |
| Example 3 | ↑ | ↑ | GST | ↑ |
| Example 4 | ↑ | ↑ | FSH | ↑ |
| Example 5 | ↑ | ↑ | PETG | ↑ |

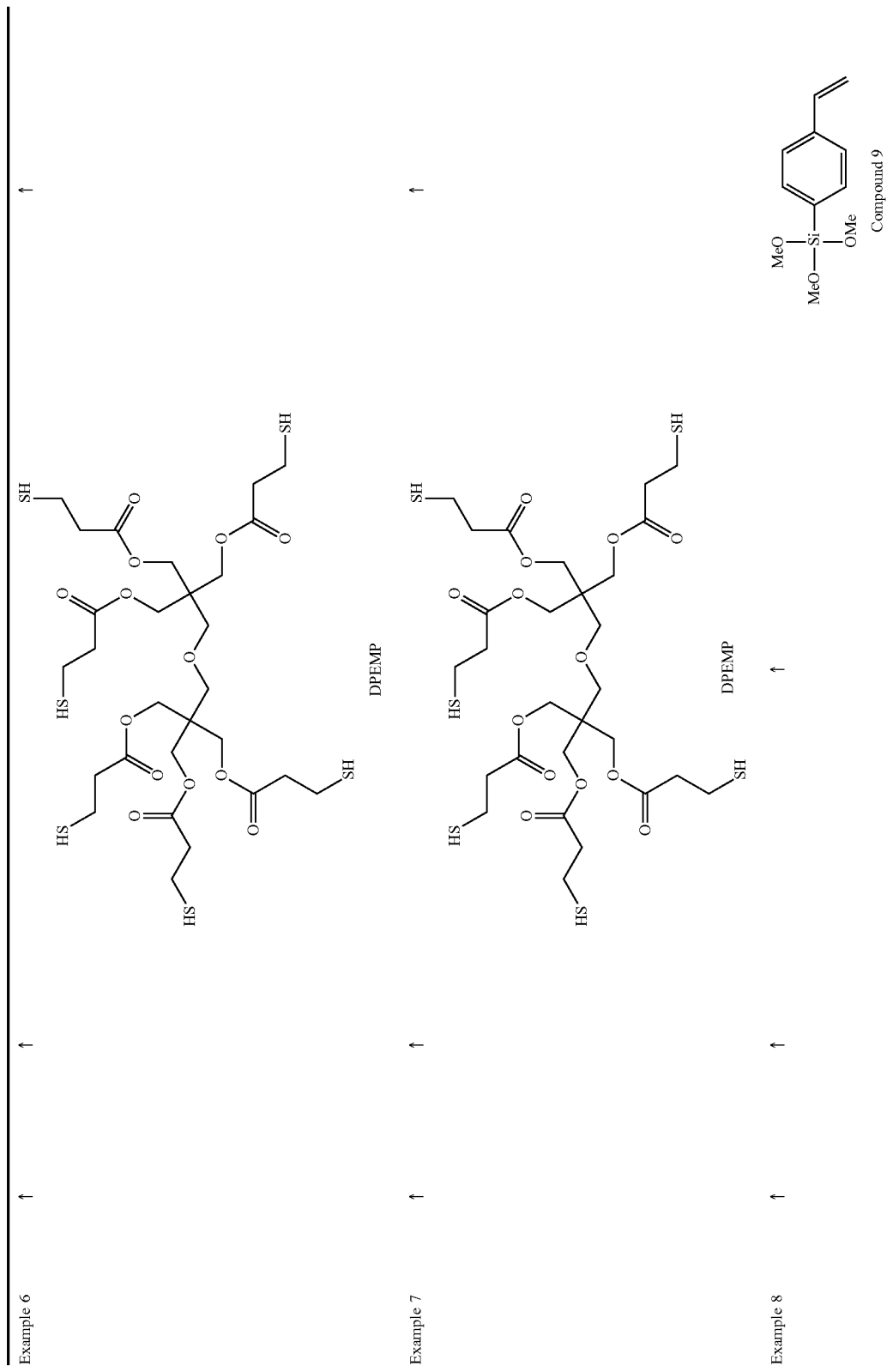

TABLE 8-continued

Example 9: Compound 10 — structure with epoxycyclohexyl group, (MeO)₂Si(OMe)—CH₂CH₂—cyclohexyl epoxide Example 10: Compound 11 — (MeO)₂Si(OMe)—(CH₂)₃—O—CH₂—glycidyl Example 11: Compound 15 — (EtO)₂Si(OEt)—(CH₂)₃—NCO

| No. | Film Thickness (μm) | (a) component/(b) component molar ratio | SH group/group reactive with SH of (b) component molar ratio | Paint Type | Film Thickness (μm) | Appearance | ¹Adhesion | ²Scratch resistance | Water contact angle (°) |
|---|---|---|---|---|---|---|---|---|---|
| Example 1 | 0.5 | 10/13 | 3/1 | Acrylic Paint 1 | 3 | Transparent | 100/100 | ○ | 5 |
| Example 3 | 0.5 | 10/13 | 2.3/1 | ↑ | 3 | ↑ | 100/100 | ↑ | ↑ |
| Example 4 | 1.0 | 10/15 | 2.7/1 | ↑ | 5 | ↑ | 100/100 | ↑ | ↑ |
| Example 5 | 1.0 | 10/15 | 2.7/1 | ↑ | ↑ | ↑ | 100/100 | ↑ | ↑ |
| Example 6 | 1.0 | 10/30 | 2/1 | ↑ | ↑ | ↑ | 100/100 | ↑ | ↑ |
| Example 7 | 1.0 | 10/15 | 4/1 | ↑ | ↑ | ↑ | 100/100 | ↑ | ↑ |
| Example 8 | 1.0 | 10/20 | 3/1 | ↑ | ↑ | ↑ | 100/100 | ↑ | ↑ |
| Example 9 | 1.0 | ↑ | ↑ | ↑ | ↑ | ↑ | 100/100 | ↑ | ↑ |
| Example 10 | 1.0 | ↑ | ↑ | ↑ | ↑ | ↑ | 100/100 | ↑ | ↑ |
| Example 11 | 1.0 | ↑ | ↑ | ↑ | ↑ | ↑ | 100/100 | ↑ | ↑ |

¹Cross-cut adhesion test
²Steel wool #0000 × 1 kg load × back and forth 10 times No scratch → ○ Scratches → X

Example 12

The same tests as in Example 1 were performed while the glass substrate was replaced by an aluminum substrate. Table 9 shows the results.

Example 13

The same tests as in Example 1 were performed while the glass substrate was replaced by a stainless steel (SUS304) substrate. Table 9 shows the results.

Example 14

The same tests as in Example 1 were performed while the glass substrate was replaced by a cement plate. Since the cement plate absorbed liquid, a primer and a composition (paint) 1 for acrylic resin were applied several times. Table 9 shows the results.

Example 15

The same tests as in Example 1 were performed while the composition 1 for acrylic resin was replaced by a paint (solid content 60%) composed of 60 g of a hard coat "UVHC1101" from Momentive Performance Materials Inc. and 40 g of a solvent methoxyethanol. Table 9 shows the results.

Example 16

In the same manner as in Example 8, a primer layer was formed using PEMP as the first essential component [(a) component] and styryl-trimethoxysilane (compound 9) as the second essential component [(b) component] on an aluminum plate sufficiently washed. The paint described in Example 15 was applied to the primer layer in the same manner. Table 9 shows the results.

Example 17

A primer layer was formed using PEMP as the first essential component [(a) component] and 3-isocyanato-propyl-triethoxysilane (compound 15) as the second essential component [(b) component] in the same manner as in Example 11. A transparent electroconductive (antistatic) paint "Conisol U-200" (manufactured by InsCon Tech Co. Ltd. and marketed by TA Chemical Co.) (solid content 10%) was applied to the primer layer in the same manner. Table 9 shows the results.

TABLE 9

| No. | Substrate Type | Primer (a) component | (b) component |
|---|---|---|---|
| Example 1 | Glass | PEMP (pentaerythritol tetrakis(3-mercaptopropionate), structure with four SH groups) | Compound 1 (MeO)₂(OMe)Si-CH₂CH₂CH₂-O-C(=O)-CH=CH₂ |
| Example 12 | Aluminum | ↑ | ↑ |
| Example 13 | Stainless steel (SUS304) | ↑ | ↑ |
| Example 14 | Cement | ↑ | ↑ |
| Example 15 | Glass | ↑ | ↑ |
| Example 16 | Aluminum | ↑ | Compound 9 (MeO)₂(OMe)Si-C₆H₄-CH=CH₂ |
| Example 17 | Glass | ↑ | Compound 15 (EtO)₂(OEt)Si-CH₂CH₂CH₂-NCO |

| No. | Film Thickness (μm) | (a) component/ (b) component molar ratio | SH group/group reactive with SH of (b) component molar ratio | Paint Type | Film Thickness (μm) | Appearance | ¹Adhesion | ²Scratch resistance | Water contact angle (°) | ³Surface resistance (Ω) |
|---|---|---|---|---|---|---|---|---|---|---|
| Example 1 | 0.5 | 10/13 | 3/1 | Acrylic Paint 1 | 3 | Transparent | 100/100 | ○ | 5 | 5 × 10¹⁰ |
| Example 12 | 1.0 | ↑ | ↑ | ↑ | ↑ | ↑ | 100/100 | ↑ | 5 | ↑ |

TABLE 9-continued

| | | | | | | | |
|---|---|---|---|---|---|---|---|
| Example 13 | ↑ | ↑ | ↑ | ↑ | ↑ | ↑ | ↑ |
| Example 14 | Unknown | ↑ | ↑ | ↑ | 100/100 | ↑ | ↑ |
| Example 15 | 1.0 | ↑ | Hard coat "UVHC1101" from Momentive | 3 | 100/100 | ○ | 80 |
| Example 16 | ↑ | ↑ | ↑ | ↑ | ↑ | ↑ | ↑ |
| Example 17 | ↑ | ↑ | Antistatic paint "Conisol U-200" from InsCon Tech | 1 | 100/100 | X | 46 | 1.2 × 10⁷ |

[1]Cross-cut adhesion test
[2]Steel wool #0000 × 1 kg load × back and forth 10 times, No scratch → ↑ Scratches → ○ Scratches → X
[3]23° C.-50% RH

Production Example 2

Preparation of Acrylic Paint 2

An [acrylic paint 2] having a composition shown in [Table 10] was prepared in the same manner as in [Production Example 1].

TABLE 10

| | | Acrylic Paint 2 | | |
|---|---|---|---|---|
| No. | Component | Amount (g) | Concentration (wt %) | Note |
| 1 | SPA-K | 0.2 | 0.57 | |
| 2 | P-2M | 0.05 | 0.14 | |
| 3 | A-GLY-9E | 4 | 11.36 | |
| 4 | A-9300-1CL | 0.5 | 1.42 | |
| 5 | U-15HA | 5.5 | 15.63 | |
| 6 | S-EED | 0.01 | 0.03 | HALS |
| 7 | Methanol | 2.5 | 7.1 | Solvent 1 |
| 8 | KTO-46 | 0.3 | 0.85 | UV polymerization initiator |
| 9 | Methoxyethanol | 22.14 | 62.89 | Solvent 2 |
| | Total | 35.2 | 100 | |

Solids (wt %) = 30

[Formula 21]

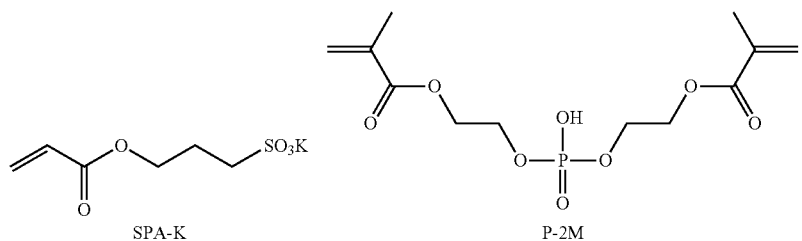

SPA-K           P-2M

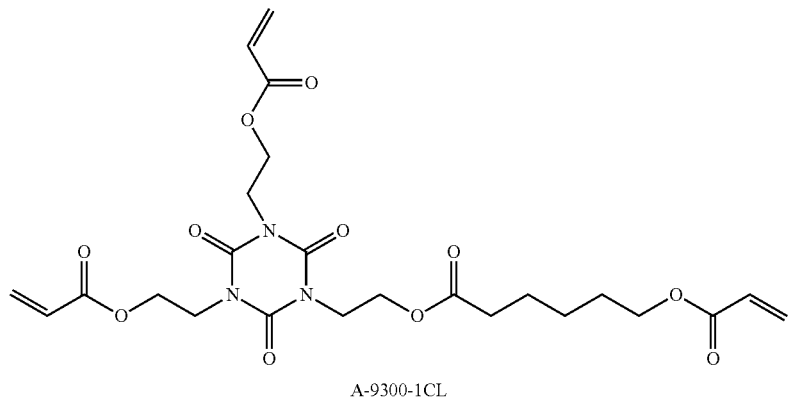

A-9300-1CL

-continued

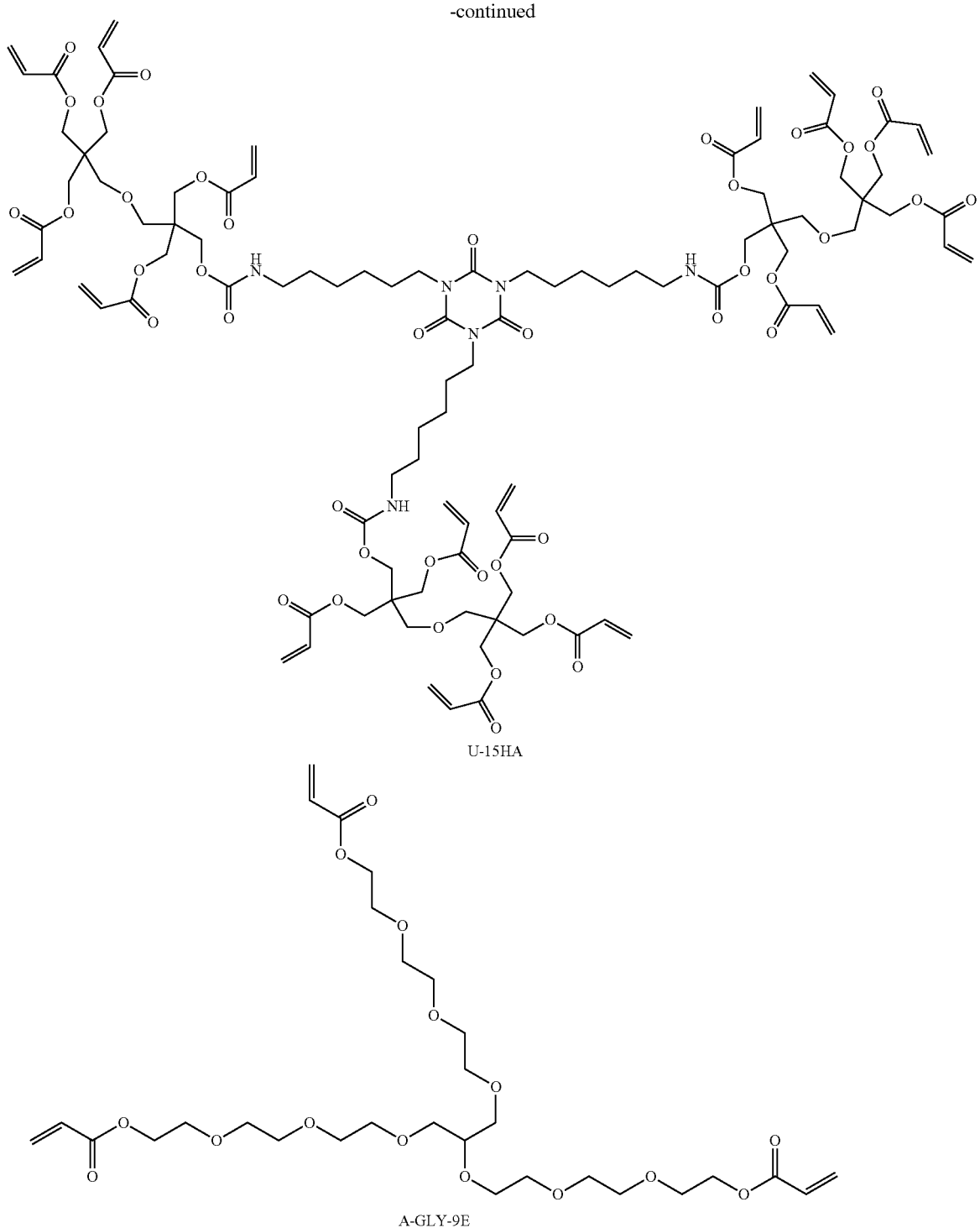

U-15HA

A-GLY-9E

Examples 18 and 19

The [primer 1] was applied with a bar coater to a glass plate having a water contact angle in the range of 5° to 6°, was heat-dried in an oven at 120° C. for one hour to form a primer layer on the glass surface, and was cooled. In Examples 18 and 19, the primer layers had thicknesses of 0.1 and 0.2 μm, respectively.

The [acrylic paint 2] was then applied to the resulting primer layer in the same manner as in Example 1 to form an acrylic resin layer having a thickness of approximately 5 μm. This acrylic resin layer was transparent and hard and was not sticky. Table 11 shows the results.

Comparative Example 7

7.9 g (0.056 mol) of 4-benzenethiol (MW=142.23), 99.4 g (0.50 mol) of 3-chloropropyl-trimethoxysilane (MW=198.72), 260.0 g of NV30%-colloidal silica (Nissan Chemical Industries, Ltd., silica sol dispersed in methanol), 57.0 g of methanol, 28.0 g of methoxyethanol, and 47.4 g of N,N-dimethylformamide were mixed to prepare a primer stock solution (SH/Cl=2/9, total weight ~499.7 g, solids=185.3 g).

The primer stock solution (499.7 g) was maintained at 10° C. 27.0 g of 0.1 N (0.365% by weight) hydrochloric acid and 1.9 g (1% by weight/solid content) of aluminum acetylacetonate were added to the primer stock solution with stirring. The primer stock solution was agitated and aged at room temperature for 20 hours or more to allow the hydrolysis reaction to proceed. Thus, a primer solution with a NV=35% by weight (total weight=528.5 g, solids=187.2 g) was prepared.

2.0 g of the primer solution and 12.2 g of methoxyethanol were then mixed to prepare 14.2 g of a primer 2 having a solid content of 4.9% by weight.

The primer 2 was applied with a bar coater to a glass plate having a water contact angle in the range of 5° to 6° and was heat-dried in an oven at 120° C. for one hour to form a 0.2 μm primer layer on the glass surface. After the glass plate was cooled, the [acrylic paint 2] was applied to the primer layer in the same manner as in Example 1 to form an acrylic resin layer having a thickness of approximately 5 μm. Table 11 shows the results.

Comparative Example 8

5.0 g (0.0255 mol) of 3-mercaptopropyl-trimethoxysilane (Shin-Etsu Chemical Co., Ltd., "KBM-803", MW=196.4), 5.0 g (0.0201 mol) of 3-methacryloyloxypropyl-trimethoxysilane (Shin-Etsu Chemical Co., Ltd., "KBM-503", MW=248.4), 95.0 g of methoxyethanol, and 95.0 g of ethanol were mixed to prepare a primer stock solution (SH/methacryloyl=1.26/1, total weight=200.0 g, solids=10.0 g).

0.4 g (4% by weight/solid content) of acetic acid and 2.5 g (three-fold equivalents/alkoxy group bonded to a silicon atom) of water were added to the primer stock solution (200 g). The primer stock solution was stirred at room temperature for three hours or more to allow the hydrolysis reaction to proceed. Thus, a primer solution with a NV=5% by weight (total weight=202.9 g, solids=10.0 g) was prepared.

2.0 g of the primer solution and 12.2 g of methoxyethanol were then mixed to prepare 14.2 g of a primer 3 having a solid content of 4.9% by weight.

The primer solution 3 was applied with a bar coater to a glass plate having a water contact angle in the range of 5° to 6° and was heat-dried in an oven at 120° C. for one hour to form a 0.2 μm primer layer on the surface. After the glass plate was cooled, the [acrylic paint 2] was applied to the primer layer in the same manner as in Example 1 to form an acrylic resin layer having a thickness of approximately 5 μm. Table 11 shows the results.

TABLE 11

| No. | Substrate Type | Primer (a) component | (b) component | Film Thickness (μm) | (a) component/ (b) component molar ratio | SH group/ group reactive with SH of (b) component molar ratio | Paint Type | Paint Film Thickness (μm) | Adhesion[1] |
|---|---|---|---|---|---|---|---|---|---|
| Example 18 | Glass | PEMP (pentaerythritol tetrakis(3-mercaptopropionate)) | Compound 1: CH₂=CH-C(=O)-O-(CH₂)₃-Si(OMe)₃ | 0.1 | 10/13 | 3/1 | Acrylic Paint 1 | 5 | 100/100 |
| Example 19 | ↑ | ↑ | ↑ | 0.2 | ↑ | ↑ | ↑ | ↑ | 100/100 |
| Comparative Example 7 | ↑ | 1,4-benzenedithiol (HS-C₆H₄-SH) | Cl-(CH₂)₃-Si(OMe)₃ | ↑ | 1/4.5 | 1/4.5 | ↑ | ↑ | 0/100 |
| Comparative Example 8 | ↑ | HS-(CH₂)₃-Si(OMe)₂(-) | CH₂=C(CH₃)-C(=O)-O-(CH₂)₃-Si(OMe)₂ | ↑ | 1.2/1 | 1.2/1 | ↑ | ↑ | 0/100 |

[1] Cross-cut adhesion test

The invention claimed is:

1. A method for manufacturing a layered product, comprising:
   forming a primer layer on at least one surface of an inorganic substrate, the primer layer being formed of a primer composition produced by mixing (a) a polythiol having at least two mercapto groups in one molecule and (b) a silane compound having at least one functional group and at least one alkoxysilyl group in one molecule, the at least one functional group being reactive with a mercapto group and selected from groups having a carbon-carbon double bond and cyclic ether groups to react a part of the mercapto groups of the (a) component with the functional group of the (b) component, and then mixing (c) water to convert the alkoxysilyl group into a hydroxysilyl group by hydrolysis with water, wherein the molar ratio of a mercapto group of the (a) component to a functional group of the (b) component reactive with a mercapto group, the number of moles of a mercapto group of the (a) component/the number of moles of a functional group of the (b) component reactive with a mercapto group, ranges from 10/1 to 2.3/1, and the polythiol is at least one compound selected from the group consisting of poly (β-mercaptopropionates, polymercaptoglycolates, poly α-mercaptopropionate, 4-mercaptomethyl-3,6-dithiaoctane-1,8-dithiol, and 4,8-bis(mercaptomethyl)-3,6,9-trithiaundecane-1,11-dithiol; and
   forming an acrylic resin layer on the primer layer, the acrylic resin layer being formed from a paint containing an acrylic resin.

* * * * *